(12) United States Patent
Ichioka

(10) Patent No.: US 6,640,011 B1
(45) Date of Patent: Oct. 28, 2003

(54) SIGNAL-EDITING DEVICE AND SIGNAL-EDITING METHOD

(75) Inventor: Hidetoshi Ichioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/437,709

(22) Filed: Nov. 10, 1999

(30) Foreign Application Priority Data

Nov. 11, 1998 (JP) ............................................. 10-320878

(51) Int. Cl.[7] .............................. G06K 9/36; G06K 9/46
(52) U.S. Cl. ................... 382/232; 375/240.26; 382/284
(58) Field of Search ................................. 382/232, 239, 382/243, 248, 250, 309, 235; 358/426.02, 426.04; 375/240.02, 240.08, 240.18, 240.2, 240.24, 240.26; 348/395.1, 403.1, 404.1, 420.1

(56) References Cited

U.S. PATENT DOCUMENTS

| | | | | |
|---|---|---|---|---|
| 5,253,056 A | * | 10/1993 | Puri et al. ............... | 375/240.01 |
| 5,408,328 A | * | 4/1995 | Boliek et al. ............. | 358/452 |
| 5,588,075 A | * | 12/1996 | Chiba et al. ............ | 358/426.06 |
| 5,638,125 A | * | 6/1997 | Jeong et al. ........... | 375/240.03 |
| 5,638,464 A | * | 6/1997 | Kawamura .................. | 382/232 |
| 5,802,213 A | * | 9/1998 | Gardos ................... | 375/240.03 |
| 6,026,180 A | * | 2/2000 | Wittenstein et al. ........ | 382/166 |
| 6,100,930 A | * | 8/2000 | Kolczynski .............. | 348/408.1 |
| 6,236,762 B1 | * | 5/2001 | Chui et al. ................. | 382/250 |
| 6,373,530 B1 | * | 4/2002 | Birks et al. ............... | 348/584 |
| 6,373,986 B1 | * | 4/2002 | Fink ........................... | 382/232 |

* cited by examiner

Primary Examiner—Timothy M. Johnson
(74) Attorney, Agent, or Firm—Frommer Lawrence & Haug LLP; William S. Frommer; Glenn F. Savit

(57) ABSTRACT

A signal editing device includes a dividing device for dividing a digital signal into processing blocks as processing units and a processing device for processing the digital signal independently in units of the processing blocks.

10 Claims, 23 Drawing Sheets

FIG. 15

```
struct BlockInfo {
    BOOL bOverflowed;    // IT IS SET TO 1 WHEN DATA IS OVERFLOWED
    BYTE nDestB;         // BLOCK NUMBER OF OVERFLOWED DATA STORING BLOCK (0 TO 29)
    BYTE nOffset;        // OFFSET IN OVERFLOWED DATA STORING BLOCK
    int nDataSize;       // NUMBER OF TOTAL BITS OF DATA OF BLOCK
                         // (INCLUDING OVERFLOWED DATA IN OTHER BLOCKS)
};

struct MacroBlockInfo{
    Pointer pMB;
    struct BlockInfo blocks[6];
};

struct VideoSegment {
    struct MacroBlockInfo macroBlocks[5];
};

struct DVFrame {
    struct VideoSegment videoSegments[NUMBER_OF_VIDEOSEGMENTS];
};
```

SIGNAL-EDITING DEVICE AND SIGNAL-EDITING METHOD

BACKGROUND OF THE INVENTION

1. Field of the Invention

The present invention relates to signal-editing devices and signal-editing methods for editing digital signals, and more particularly to a signal-editing device and a signal-editing method which are suitable for editing digital signals, such as still images, moving images, and the like.

2. Description of the Related Art

Heretofore, when digital signals, such as still images or moving images, are edited, a single entire image frame of the images is processed as an editing processing unit. Particularly, when the digital signal is processed where various transformations, such as compressions and color space conversions, are performed, an original signal (e.g., an RGB signal) is obtained by performing inverse-transformation on the entire image, which is edited, and which in turn is re-transformed. Since the digital signals, such as the images, require a mass storage capacity, they are normally transferred or stored in a compressed format.

FIG. 22 shows one example of a process in a case in which a single image frame of a digital video (DV) signal is edited where the image is encoded by performing entropy coding or the like.

In the editing process, as shown in FIG. 22, the digital signal input from a tape or a hard disk is processed in order of entropy decoding (step S1001), dequantization (step S1002), inverse discrete cosine transform (step S1003), and RGB converting block synthesis (step S1004). Finally, data obtained by the above-described steps is edited (step S1005).

Subsequent to the above-mentioned editing process, the inverse transformations are processed in order of $YC_bC_r$ converting block definer (step S1006), discrete cosine transform (DCT) (step S1007), quantization (step S1008), and entropy coding (step S1009).

When the above-described compressed image is edited, compression and decompression processes consume a considerable amount of CPU time. Particularly, when those processes are performed with a software implementation, the working efficiency is substantially reduced.

Even when the image-editing is performed with a hardware implementation, since inverse transformation and re-transformation bring about errors or changes in compression conditions, image-deterioration occurs in the entire image.

As is shown in FIG. 23, when a title-characters-block 10001a is inserted on an image 1001, image-deterioration occurs in a region where the title-characters-block 1001a does not reside. Particularly, when a series of various effects is applied to the same image, serious image-deterioration occurs.

The image editing process normally includes a step of decompressing the entire image into the original image (e.g., the RGB signal), a step of performing a desired processing on the original signal, and a step of re-compressing the signal obtained by the above processing. However, editing-processing such as insertion of the title-characters-block and an image-switching are often performed on a local portion of the entire image. In these cases, no processing needs to be performed on the remainder which is the major portion of the entire image.

SUMMARY OF THE INVENTION

Accordingly, it is an object of the present invention to provide a signal editing device and signal editing method capable of performing fast digital signal processing with less image deterioration.

To this end, according to a first aspect of the present invention, a signal editing device includes a dividing device for dividing a digital signal into processing blocks as processing units and a processing device for processing the digital signal independently in units of the processing blocks. Since the digital signal is divided by the dividing device into processing blocks as a processing unit which are independent from one another, processing can be performed only on minimum required regions that need to be processed.

In a signal editing device according to a first aspect of the present invention, the digital signal may represent a still image or a moving image and the dividing device may divide the digital signal into the processing blocks in a domain among the space-domain, the time-domain, and the frequency-domain.

In a signal editing device according to a first aspect of the present invention, the digital signal may be compression-coded in compression-coded processing units and the dividing device may divide the digital signal into the processing blocks as the compression-coded processing units.

A signal editing device according to a first aspect of the present invention may further include a processing block extracting device for extracting a processing block requiring the processing of the digital signal and a processing block requiring no processing of the digital signal.

A signal editing device according to a first aspect of the present invention may further include a duplicating device for duplicating the processing block requiring no processing, which is extracted by the processing block extracting device.

A signal editing device according to a first aspect of the present invention may further include a decoding device for decoding the digital signal in a predetermined format and for outputting the decoded signal to the processing device and an encoding device for encoding an output signal from the processing means in a predetermined format, and the digital signal may be compression-coded.

In a signal editing device according to a first aspect of the present invention, the decoding device may includes a plurality of decoding processing steps, and the encoding device includes a plurality of encoding processing steps corresponding to the processing steps.

In a signal editing device according to a first aspect of the present invention, the processing device may perform synthesizing processing on a plurality of the processing blocks.

In a signal editing device according to a first aspect of the present invention, the processing device may perform processing on the processing blocks by using predetermined processing steps, and the predetermined processing steps may be created before the processing is performed.

According to a second aspect of the present invention, a signal editing method includes the steps of dividing a digital signal into processing blocks as processing units and processing the digital signal independently in a unit of the processing blocks.

In the signal editing method according to a second aspect of the present invention, the digital signal may represent a still image or a moving image, and the digital signal may be divided into the processing blocks in a domain among the space-domain, the time-domain, and the frequency-domain.

The above configuration enables the signal editing device of the present invention to be a fast and high-quality editing for a digital signal, such as a still image or a moving image, which is implemented by software or hardware.

Specifically, when image editing processing is performed in the space domain, for example, when image-switching processing with a "horizontal wipe" is processed by performing synthesizing processing on two images, a particular processing (synthesis) is performed only on an image-switching boundary regions on which synthesizing processing needs to be performed, while mere duplication of a part of a source image is performed on the remainder, major part of the images. Thus, fast and high quality image editing is obtained.

When image editing processing, such as "title-insertion" processing, is performed, the processing is performed as a processing unit only on regions which relate to "title-insertion" processing, whereby fast image editing processing is obtained while image deterioration caused by image editing is suppressed.

When image editing processing is performed in the time domain, for example, when image-switching processing is performed, the processing is performed only on image frames which relate to image-switching processing while the other image frames are just duplicated, whereby fast and high quality image editing is obtained.

Image editing processing performed in the frequency domain is very effectively performed on images whose file formats employ an orthogonal transform, such as discrete cosine transform (DCT). When the image is divided by a frequency component, and the resolution of the image is reduced to half, the reduction of the resolution is achieved by extracting low frequency components of the image as a processing unit. Thus, an editing system with fast and high quality image editing is obtained.

Since the editing system selectively performs processing by extracting only a part of processing blocks in the space domain, the time domain, or the frequency domain, even solely by a software implementation, the system can be fast and efficient.

By limiting regions on which, for example, a transformation-processing on a minimum area from a decompressing state to a recompressing state is to be performed, fast editing processing is obtained while, by performing merely duplicating processing on the remainder, major part, of the images, high quality editing is available with less deterioration. Further, because the editing system can select an optimizing format for processing on regions which need to be processed, appropriate processing can be performed in accordance with a demand, such as the efficiency, the picture-quality, and the implementing feasibility.

DESCRIPTION OF THE DRAWINGS

FIG. 15 shows a concrete example of dividing information;

FIG. 20 is a flowchart of a process for acquiring the overflowed data out of a block where the overflowed data is stored in a macro-block other than the macro-block the block belongs to.

DESCRIPTION OF THE PREFERRED EMBODIMENTS

Embodiments of the present invention are described with reference to the accompanying drawings. In these embodiments, a signal-editing device and method of the present invention is applied to an image editing device for processing the digital signals of a still image, a moving image or the like.

Figure 1:
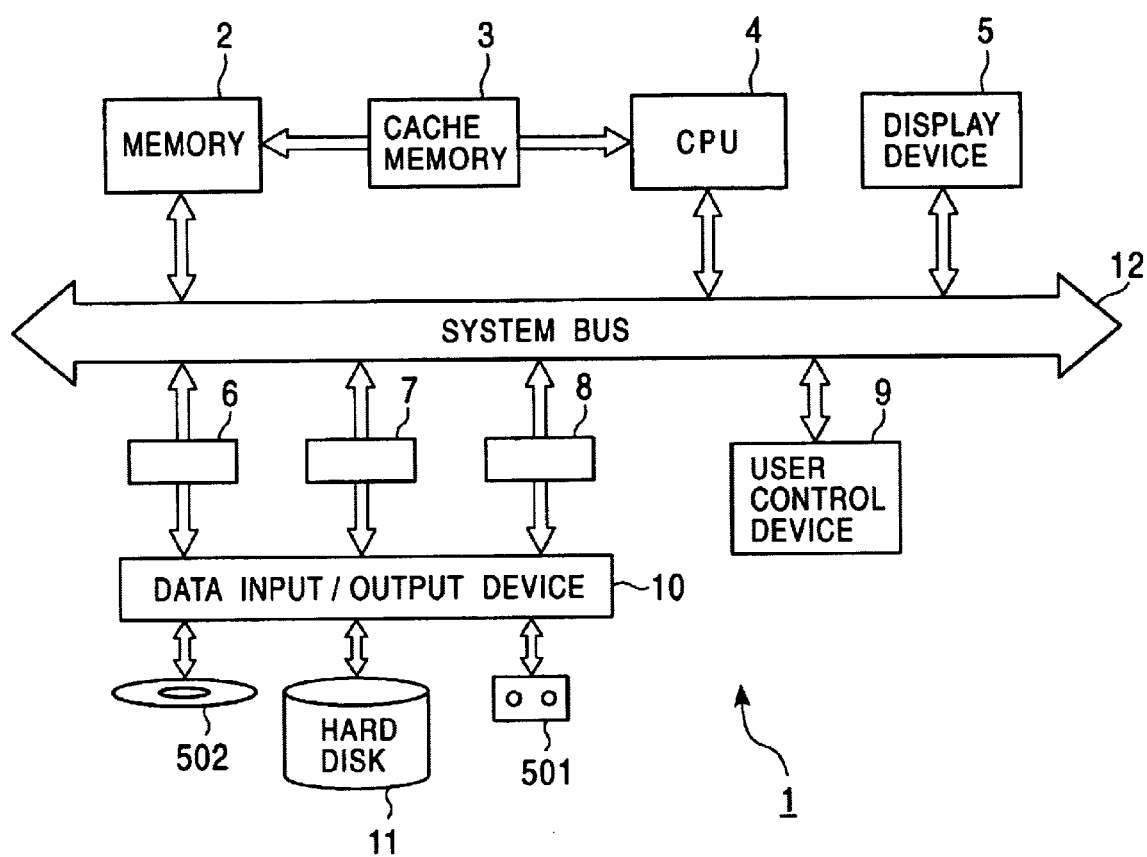
FIG. 1 is a block diagram of an image editing device according to an embodiment of the present invention.

In FIG. 1, the image editing device 1 includes a memory 2, a cache memory 3, a CPU 4, a display device 5, input/output interfaces 6, 7, and 8, a user control device 9, a data input/output device 10, and a hard disk 11. In the image editing device 1, each component is interconnected via a system bus 12.

Figure 2:
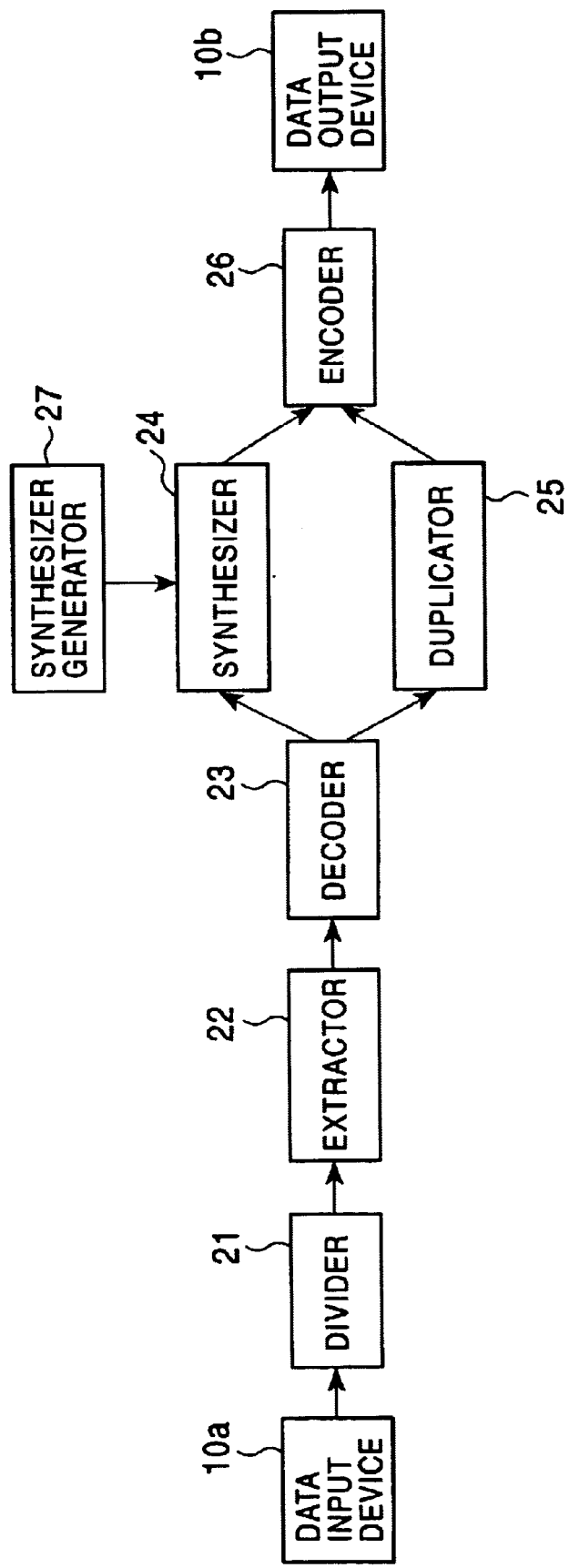
FIG. 2 is a block diagram of a critical portion of the image editing device.

As shown in FIG. 2, the image editing device 1 includes a divider 21 receiving input data from a data input device 10a, an extractor 22, a decoder 23, a synthesizer 24, a duplicator 25, an encoder 26 sending output data to a data output device 10b, and a synthesizer-generator 27.

With the above arrangement, the divider 21 divides the digital signals such as the still image, the moving image, and the like into processing blocks as processing units. The synthesizer 24 performs a desired processing on the digital signals independently of each processing unit.

Each component of the image editing device 1 is described below.

The data input/output device 10 performs an input/output operation on a storage medium.

Specifically, the data input/output device 10 is a storage device which drives a tape-medium such as a digital video tape 501; a disk-medium such as a disk 502, e.g., a floppy disk and a compact disk, and the hard disk 11; and the like.

The data input/output device 10 includes, as shown in FIG. 2, a data input device 10a and a data output device 10b.

The data input device 10a of the data input/output device 10 acquires the digital signals from the media. The digital signals include still images or moving images whose file formats are arbitrary.

The data output device 10b of the data input/output device 10 writes the digital signals on the media.

The input/output interfaces 6, 7, and 8 enable data to be transferred between each of the media such as the disk 502, the hard disk 11, and a digital cassette tape 501, and the data input/output device 10. The input/output interfaces 6, 7, and 8 are configured as normally digital interfaces such as a peripheral component interconnect bus (PCI bus), and Institute of Electrical and Electronics Engineers (IEEE) 1394.

Each medium stores an input image for editing, a current image, and an output image.

The user control device 9 is a user interface which includes data input devices, such as a keyboard and a mouse.

The display device 5 displays an image and includes a so-called "display monitor", for example.

The memory 2 stores various data, such as image data and application programs. The image editing device 1 edits the image data loaded in the memory 2.

The CPU 4 controls each component. For example, the CPU 4 processes data in accordance with a program loaded in the memory 2. The cache memory 3 stores temporary data for the use by the CPU 4 and, for example, is provided in the memory 2.

The configuration of the image editing device 1 of FIG. 2 is described with reference to the data flow among each component, using FIGS. 3 and 4.

The divider 21 divides the input image signal acquired from the data input device 10a into appropriate processing units.

Specifically, when a moving picture is processed, the divider 21 can divide each frame of the moving picture as the processing block, which is the processing unit, or each pixel-line of a single frame as the processing block.

Further, the divider 21 divides the digital signals into each processing block in the space-domain, the time-domain, or the frequency-domain.

The dividing processing of the digital signals by the divider 21 in the space-domain, the time-domain, and the frequency-domain are described.

Figure 5:
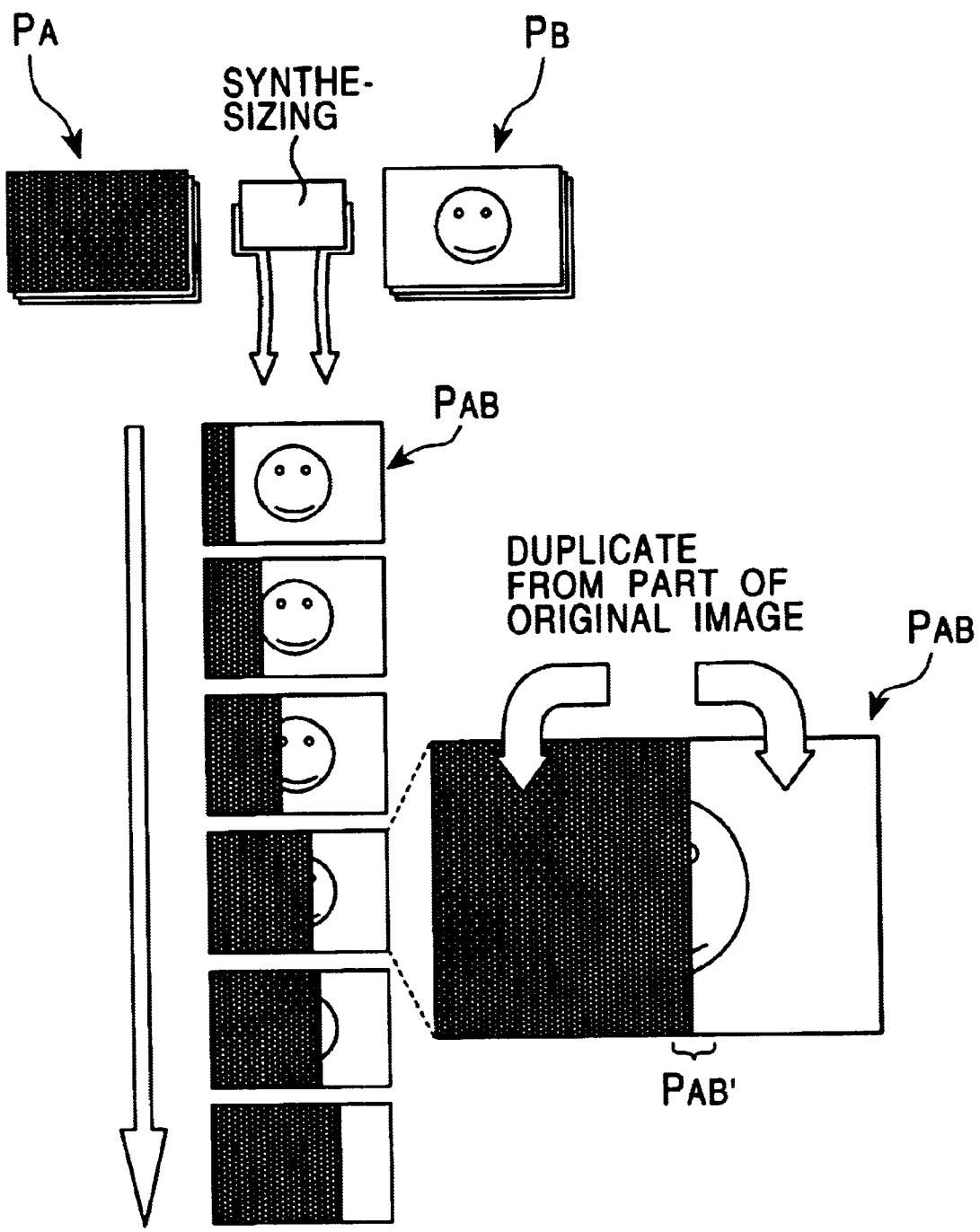
FIG. 5 illustrates synthesizing processing as an example of the division in the space domain when image-switching is performed by "horizontal wipe"

The dividing processing in the space-domain is described using FIG. 5. FIG. 5 shows an example of the editing process of switching images by the use of a so-called "horizontal wipe" where synthesizing processing is performed on two moving pictures $P_A$ and $P_B$. By performing dividing processing in the space domain, the divider 21 extracts only the boundary region $P_{AB}'$ around the boundary where the image-switching occurs and divides the image as the processing block.

When dividing processing is performed in the space domain, the actual process of extracting an arbitrary processing block out of the image is as follows: A reference table and the like are created based on the results of dividing processing in the space domain which show "the row number and the column number of each block versus the body of a block". An arbitrary processing unit can be extracted through the row number and the column number of the processed block. This processing step is described later.

Because the entire input image does not need to be divided, only the desired portion of the image can be selected and divided for a subsequent processing step. The shape of the divided block obtained by performing dividing processing in the space domain may be any type of shape, such as a point, a line, a rectangle, or a circle.

When dividing processing is performed in the time domain, for example, the image frames relating to the image-switching processing, are extracted and are divided as the processing block. For example, dividing processing is performed in the time domain by extracting a single entire image frame out of the moving picture in accordance with a frame number.

Dividing processing is performed in the frequency domain, for example, when the resolution of the image in FIG. 6A, which is divided into frequency components, is reduced to half, the size of the image is reduced to quarter. In this case, the divider 21 divides the processing block, as shown in FIG. 6B, obtained by extracting a 4×4 low-frequency component out of the image. Because the fine detailed information of the image is concentrated in higher frequency components of the image, the reduction of the resolution of the image obviates the higher frequency components. Dividing processing in the frequency domain is effectively performed on images whose file format particularly employs an orthogonal transform, such as discrete cosine transform (DCT).

By extracting the direct current component from the image, a thumbnail image with a scale of 1/64 of the image size can be divided out of the image as the processing block.

Figure 3:
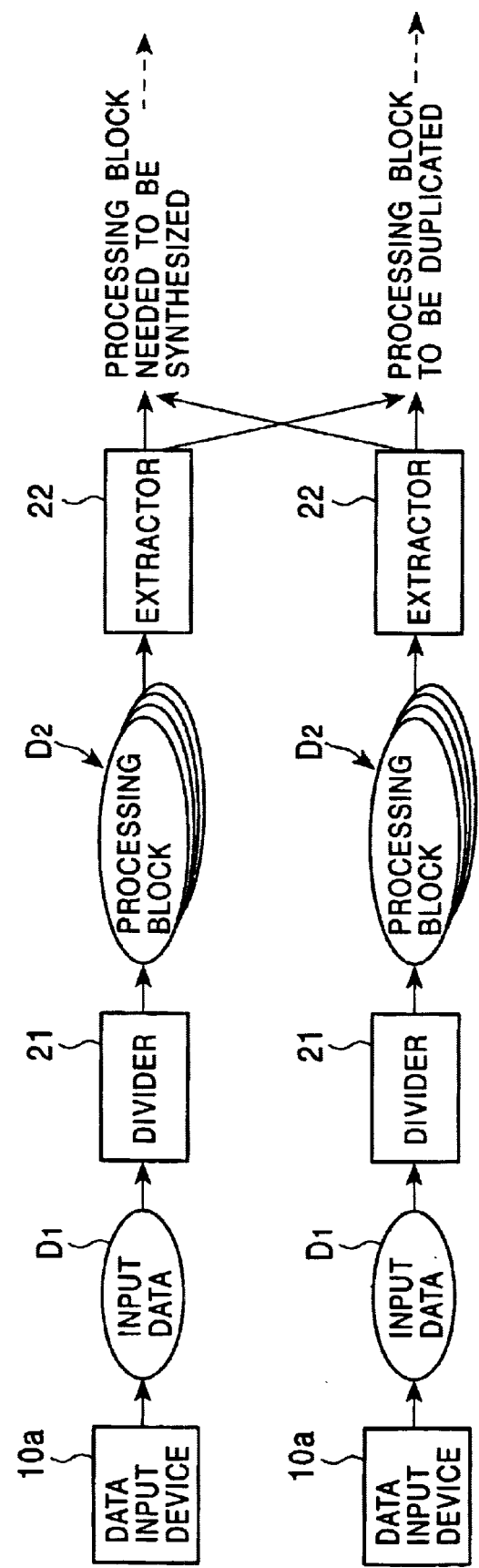
FIG. 3 shows dividing and extracting processing steps of the image editing device.
Figure 4:
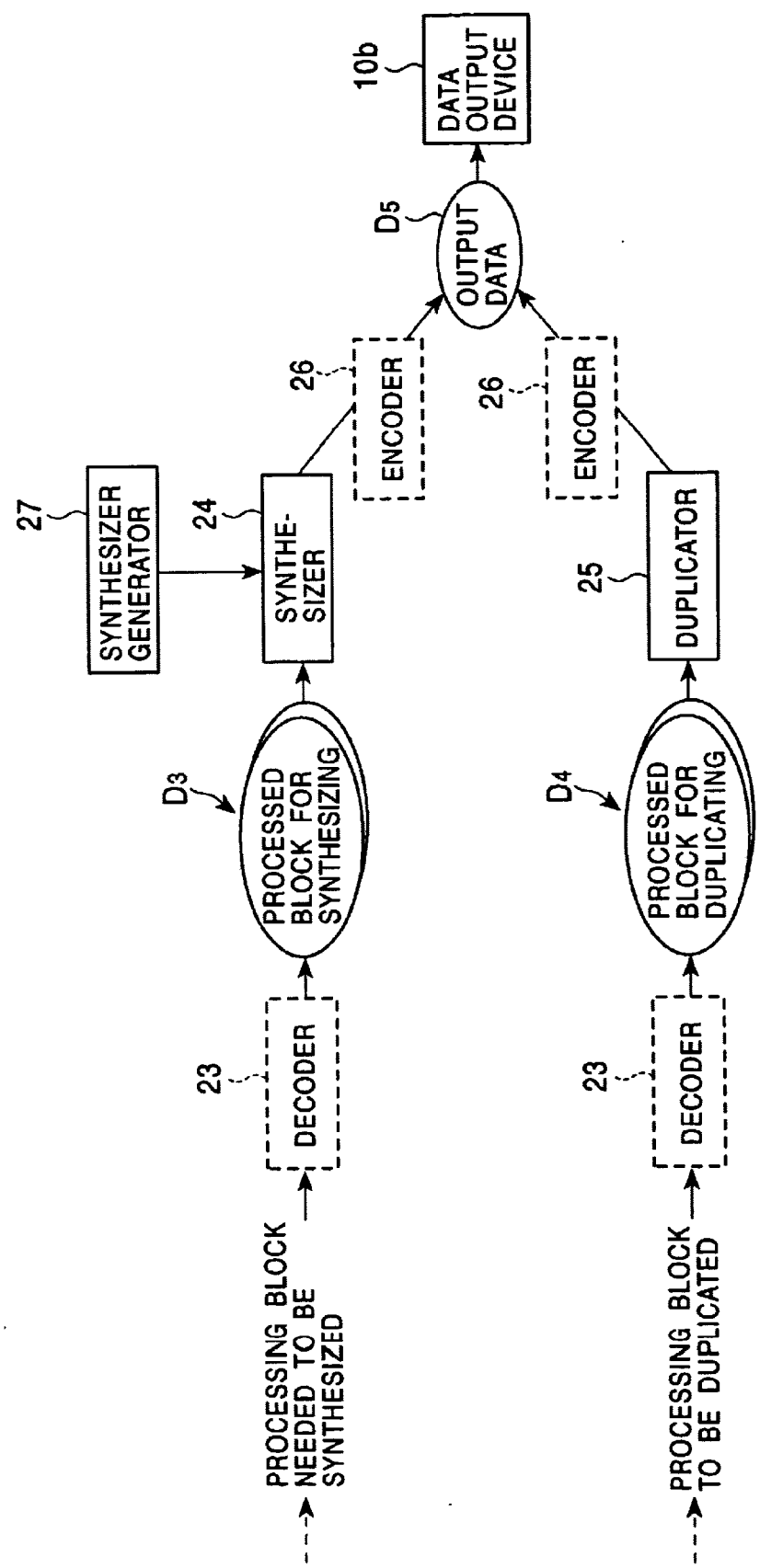
FIG. 4 shows synthesizing and duplicating processing steps of the image editing device.

The input data $D_1$ in FIG. 3 is image data whose file format is an image compression format, such as Digital Video (DV), Moving Picture Experts Group (MPEG), or Joint Photographic Experts Group (JPEG) formats. Because in these file formats the digital signals are already divided into, for example, macro-blocks based on each DCT block, or into blocks based on encoded units, the divider 21 just accepts each divided block as the processing unit.

Figure 6:
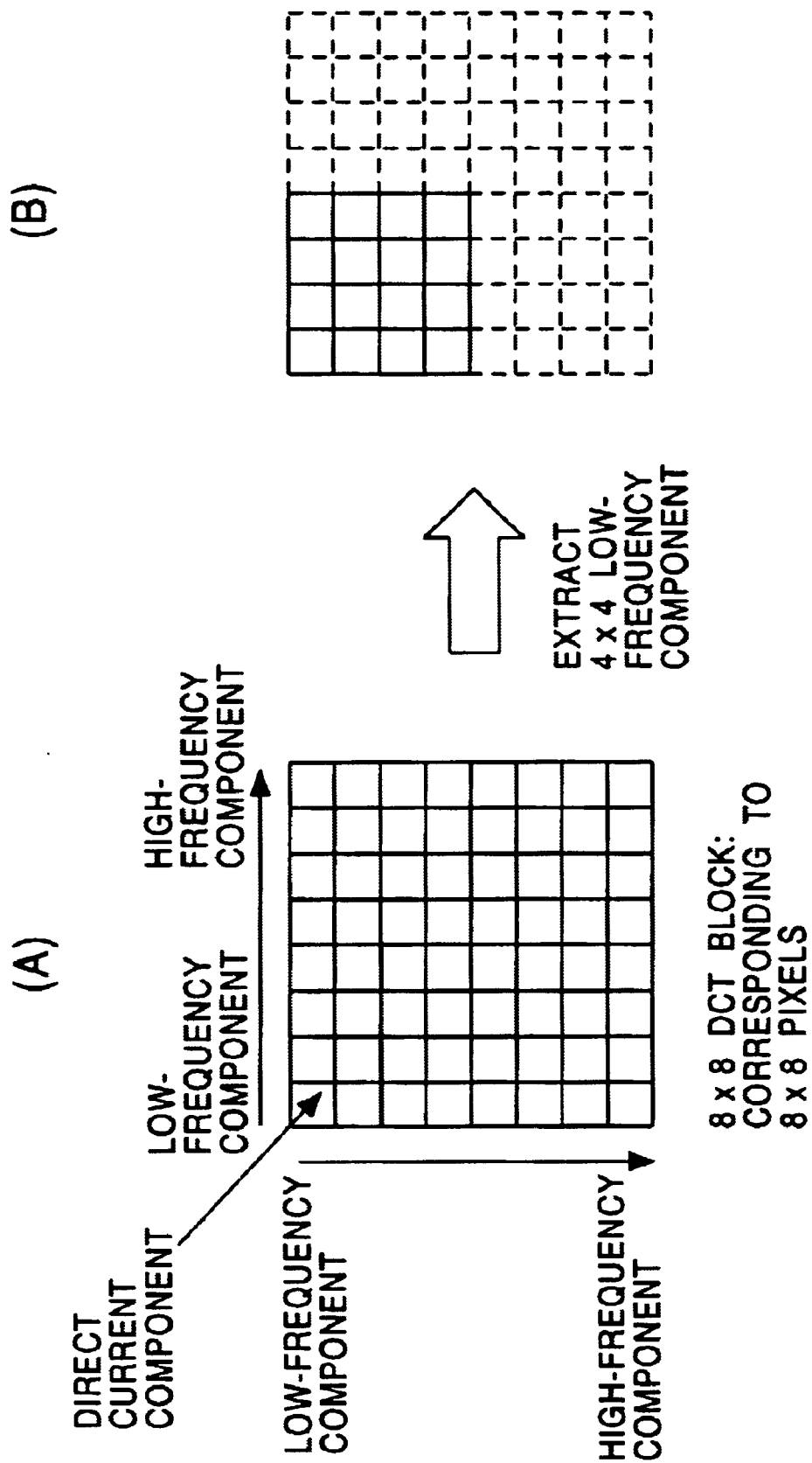
FIG. 6 illustrates the change of the resolution of an image as an example of the division in the frequency domain.

When such dividing processing in the frequency domain is utilized, image dividing processing is performed by causing arbitrary frequency data to be obtained from, for example, one band order or a range of band orders. For example, as shown in FIG. 6, the resolution of the image is changed by extracting frequency components in the range of the 0th order (the direct current component) to the (low-frequency) third order in response to input band orders in the range of the 0th to the third order.

The divider 21 thus performs the dividing processing over the image in the space-domain, the time-domain, or the frequency-domain.

Figure 7:
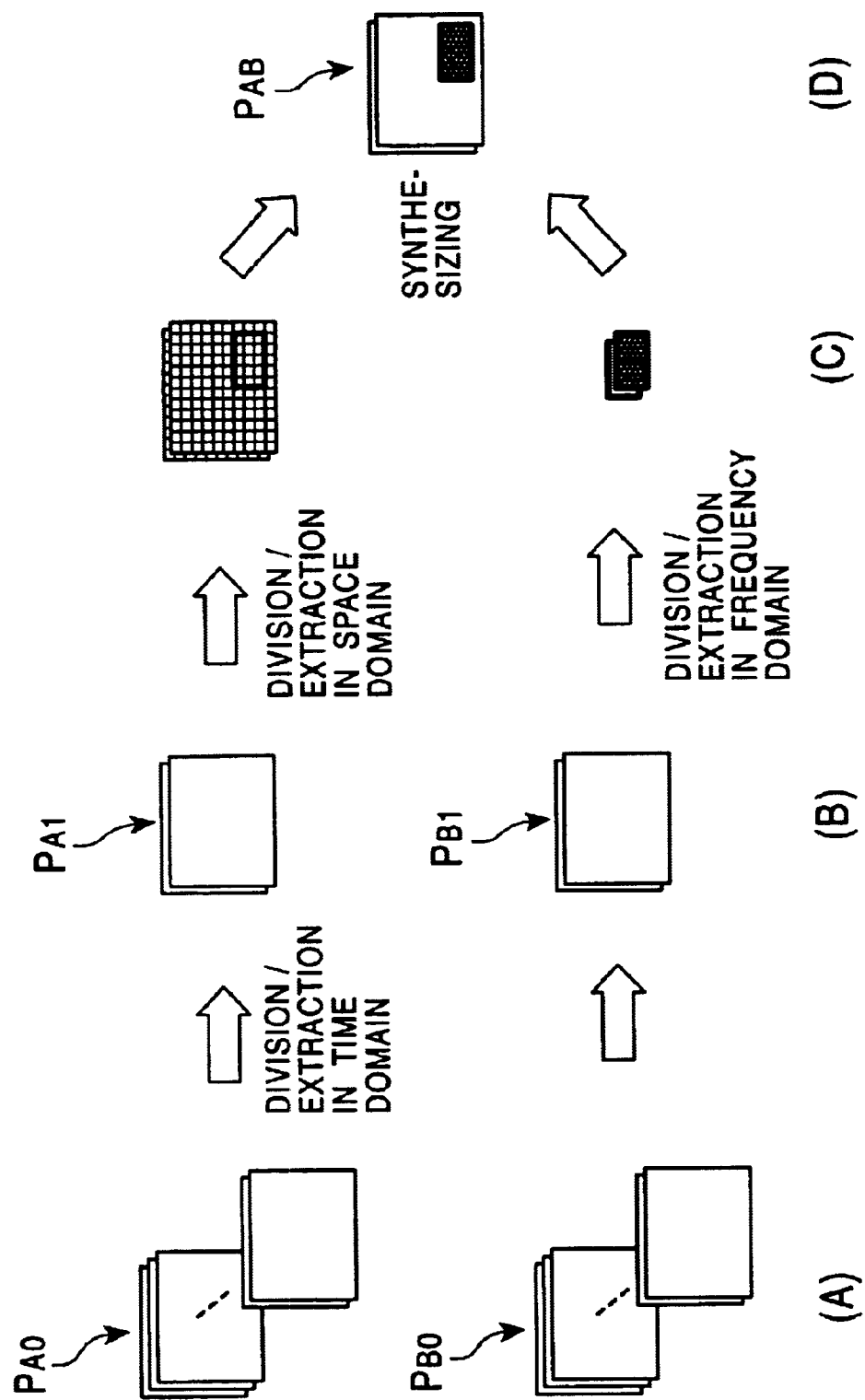
FIG. 7 illustrates an example of dividing processing by the use of a combination of divisions in different domains.

The dividing processing in the above domains is not necessarily performed exclusively. The dividing processing can be performed by a combination of some of the domains. For instance, as shown in FIG. 7, when synthesizing processing is performed on two moving pictures $P_{A0}$ and $P_{B0}'$ image frames $P_{A1}$ and $P_{B1}$ are extracted at each editing point by performing dividing processing in the time domain (processing illustrated in (A) to (B) of FIG. 7). The desired region to be processed is extracted out of the extracted image frames $P_{A1}$ and $P_{B1}$ by the block unit (e.g., an 8×8 DCT block, for example) by performing dividing processing in the space domain while the low-frequency components are extracted by performing dividing processing in the frequency domain, whereby a reduced image (processing illustrated in (B) to (C) of FIG. 7) is created. Finally, a synthesized video image $P_{AB}$ is obtained by combining what are acquired by performing dividing processing in both domains (processing illustrated in (C) to (D) of FIG. 7).

As shown in FIG. 3, processing blocks $D_2$ thus obtained are input to the extractor 22. The processing block $D_2$ is a minimum processing unit for the subsequent processes, and has a format and a shape, for example those of the DCT block, in accordance with the divider 21.

The extractor 22 extracts necessary and unnecessary processing blocks to be processed.

Specifically, the extractor 22 selects processing blocks, among a set of the divided processing blocks $D_2$, which synthesizing processing needs to be performed. The extractor 22 allows the selected processing blocks, as processing blocks $D_3$ for synthesizing, to be input to the synthesizer 24 while allowing the processing blocks which synthesizing processing are not required to be performed to be input as processing blocks $D_4$ for duplicating to the duplicator 25. Extracting patterns are determined based on a set of block numbers given by a user. For example, the extracting pattern varies in accordance with an image-switching method.

The decoder 23 is provided between the extractor 22, and the synthesizer 24 or the duplicator 25. When the output data from the extractor 22 is encoded, the decoder 23 decodes the encoded data in an appropriate format for the synthesizing processing as required.

Figure 8:
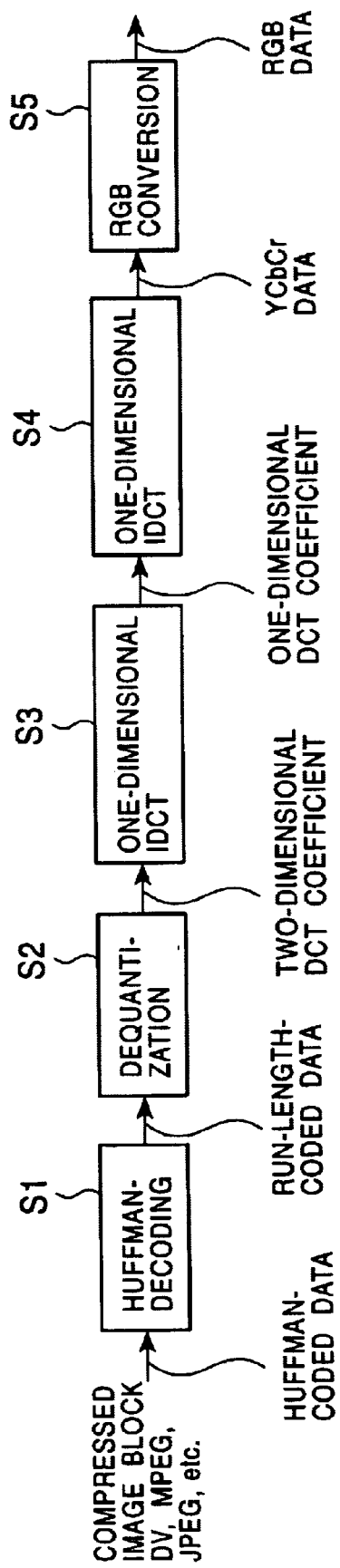
FIG. 8 shows decoding processing steps by the decoder of the image editing device.

In the decoder 23, as shown in FIG. 8, the decoding processing includes a plurality of processing steps. The decoding processing is described as follows where an input image to the decoder 23 is Huffman-coded.

At step S1, a compressed image block, which is input to the decoder 23 as a processing unit, is Huffman-decoded into run-length-coded data.

At step S2, the run-length-coded data is dequantized into the two-dimensional coefficients.

At step S3, the one-dimensional DCT coefficients are obtained by performing one-dimensional inverse DCT on the two-dimensional coefficients.

At step S4, $YC_bC_r$ data is obtained by performing one-dimensional inverse DCT on the one-dimensional DCT coefficients.

At step S5, the $YC_bC_r$ data is RGB-converted into RGB data.

With the above-described processing steps, the decoder 23 decodes the input data in the appropriate format for the synthesizing processing. The RGB data generated by the decoder 23 is input to both the synthesizer 24 and the duplicator 25.

The outputs from the synthesizer 24 or the duplicator 25 are input to the encoder 26 for re-encoding the processed image data which is decoded by the decoder 23.

Figure 9:
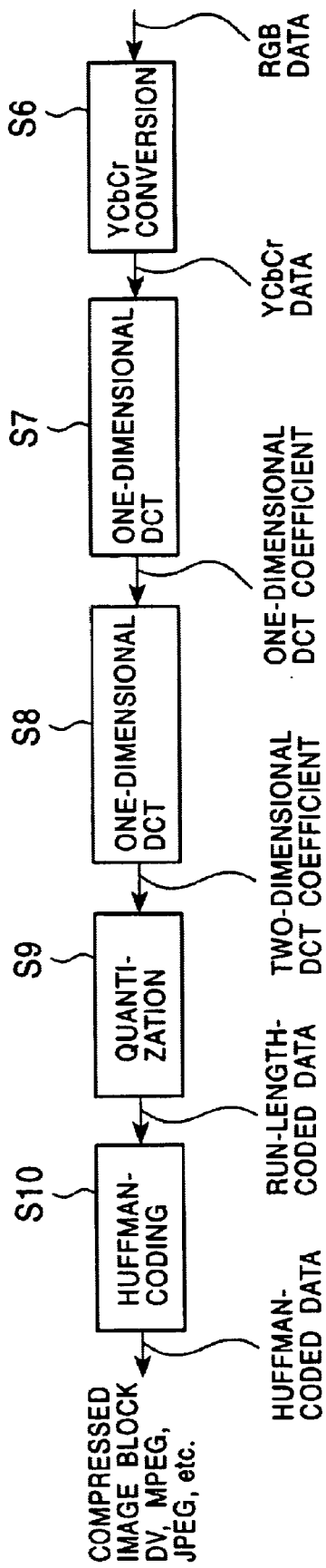
FIG. 9 shows encoding processing steps by the encoder of the image editing device.

As shown in FIG. 9, the encoder 26 encodes the input image data in a predetermined format in the reverse order of the decoding steps by the decoder 23.

At step S6, the encoder 26 performs $YC_bC_r$-conversion on the processed RBG data by the synthesizer 24 or the duplicator 25 into $YC_bC_r$ data.

At step S7, one-dimensional DCT coefficients are obtained by performing one-dimensional DCT on the $YC_bC_r$ data.

At step S8, two-dimensional coefficients are obtained by performing one-dimensional DCT on the one-dimensional DCT coefficients.

At step S9, the two-dimensional DCT coefficients are quantized into run-length-coded data.

At step S10, the run-length-coded data is Huffman-coded into Huffman-coded data.

With the above-described processing steps, the encoder 26 re-encodes the processed input data in the predetermined format before the decoder 23 decodes.

The decoder 23 is constructed so that the resultant formatted data can be obtained at each step of the decoding processing. For example, the decoder 23 can stop at any step of the decoding processing in FIG. 8, and can acquire the data in the resultant format at that point. Specifically, when the decoder 23 stops at the dequantization step in the decoding processing, the two-dimensional DCT coefficients can be obtained.

By allowing the output from any step of the decoding processing to be obtained, the data in the appropriate format for subsequent synthesizing processing can be selected.

Figure 10:
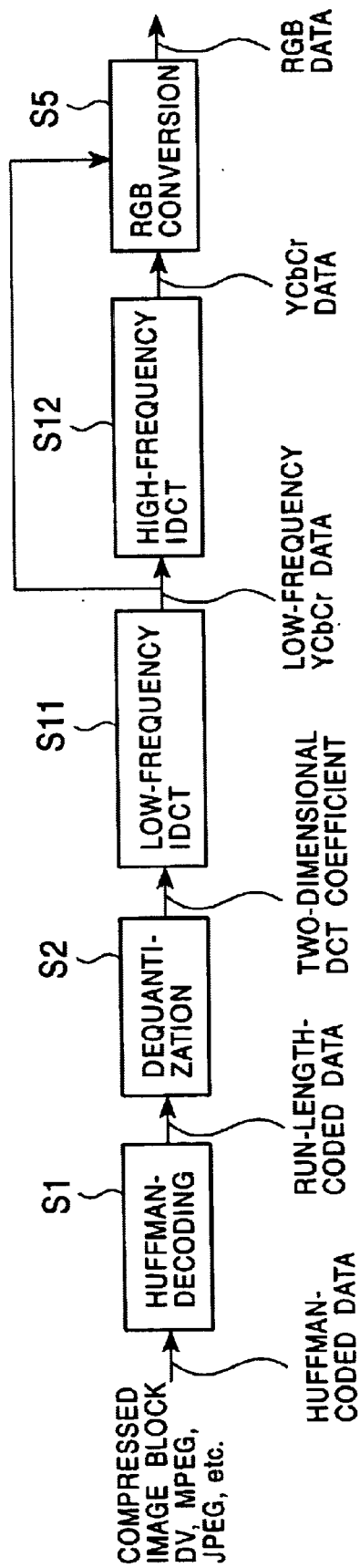
FIG. 10 shows another decoding processing step by the decoder of the image editing device.

FIG. 10 shows another example of decoding processing by the decoder 23. In this example, as shown in FIG. 10, the decoder 23 divides steps of performing inverse-DCT on two-dimensional coefficients obtained at step S2 into a step of performing low-frequency inverse-DCT for decoding the low-frequency components of the input data and a step of performing high-frequency inverse-DCT for decoding the high-frequency components of the input data. The divided processing steps enable the decoder 23 to obtain low-frequency-decoded results.

The intermediate decoded data obtained by the above-described decoding method can be applied to a dissolve processing. The dissolve processing is an image-displaying method in which when a current scene is switched to the next scene, the next scene is replaced with the current scene by gradually fading out the current scene.

Incidentally, the decoder 23 is required only when input data to the image editing device 1 is encoded. Hence, the decoder 23 does not have to be provided in a case where input image data is not encoded.

A processing block decoded by the decoder 23 is input to the duplicator 25 where the contents of the processing block is duplicated onto another determined location. For example, the duplicator 25 produces a duplicate of the processing block at any location of the image data by designating the block number corresponding to a destination block.

The processing blocks from the decoder 23 as well as the duplicator 25 are input to the synthesizer 24 which includes a processing unit for the processing block. The synthesizer 24 produces a new processing block by performing synthesizing processing on the processing blocks. Specifically, the synthesizer 24 accepts more than two processing blocks as input data, stores those blocks at an appropriate location of memory, such as the cache memory 3, and performs synthesizing processing thereby producing a single processing block.

Since it is possible to obtain the output from each step of the decoding processing by the decoder 23, the synthesizer 24 can perform synthesizing processing on the processing block in accordance with the format of the output processing block.

Specifically, the synthesizer 24 is implemented with software and is represented, for example, in a matrix format expression. The synthesizer-generator 27 generates the synthesizer 24 in the matrix format.

Figure 11A:
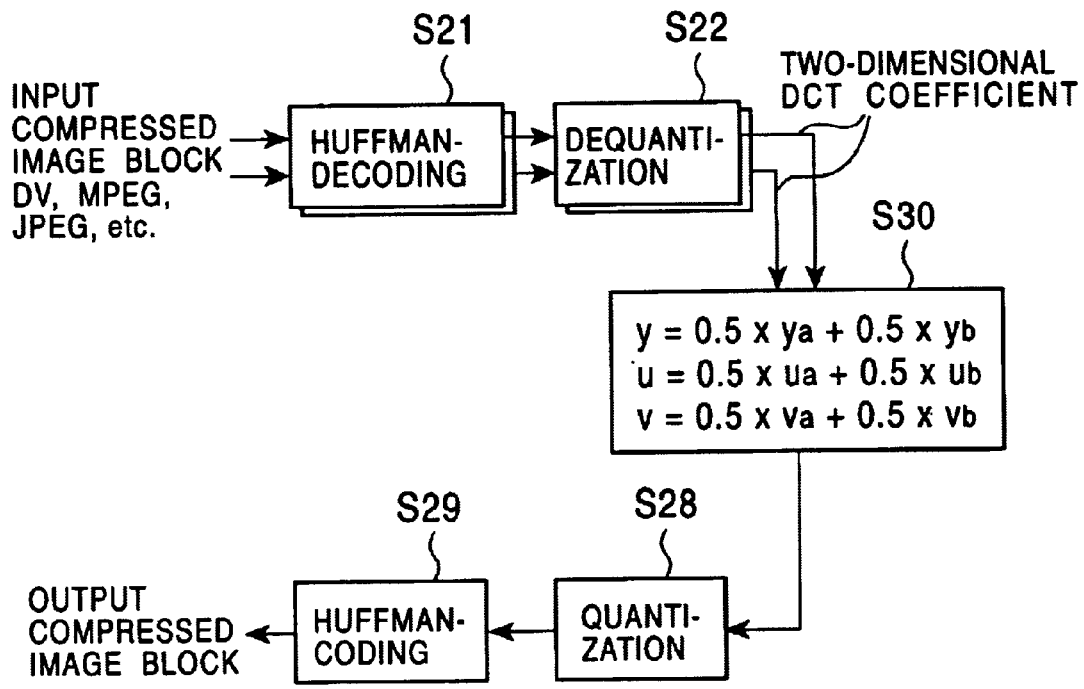
FIGS. 11A and 11B show processes of synthesizing processing which are performed on two-dimensional coefficients.
Figure 11B:
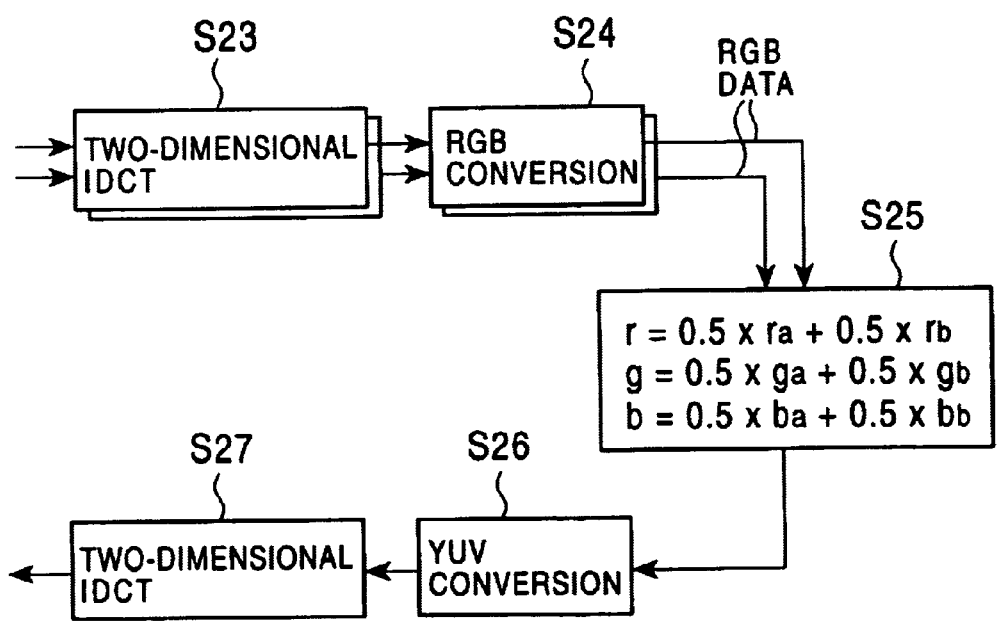
Figure 12:
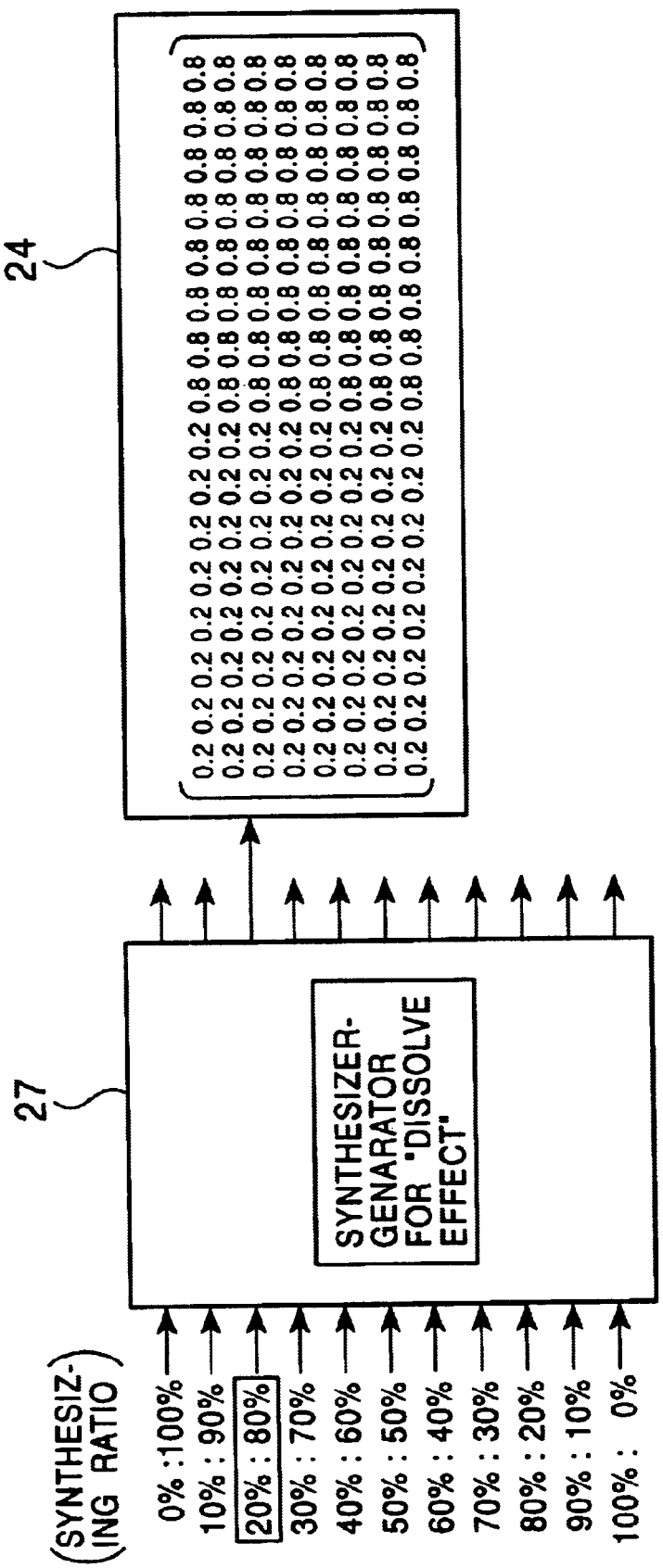
FIG. 12 shows an example of generating a synthesizer by a synthesizer-generator.

The synthesizer 24 and the synthesizer-generator 27 are described with reference to FIGS. 11A, 11B and 12. FIGS. 11A and 11B show the processing steps where an input compressed image block is decoded through a plurality of the decoding steps. Processing is performed on a processing block, which is extracted among the above steps. The compressed image block is output in the original data format. The processing steps are the same as shown in FIGS. 8 and 9, which include the decoding processing steps and the encoding processing steps.

Specifically, the decoding processing steps include Huffman-decoding (step S21), dequantization (step S22), two-dimensional inverse DCT (step S23), and RGB-conversion (step S24). The encoding processing steps include YUV-conversion (step S26), two-dimensional inverse DCT (step S27), quantization (step S28), and Huffman-coding (step S29).

In the above-described order of the processing steps, as shown in FIG. 11A, at step S30, the synthesizer 24 performs synthesizing processing on two-dimensional DCT coefficients obtained by dequantizing at step S22, or, as shown in FIG. 11B, at step S25, the synthesizer 24 performs synthesizing processing on RBG data obtained by RGB-conversion at step S24.

Specifically, at step S25, the synthesizer 24 performs synthesizing processing on the value of each corresponding pixel in the corresponding blocks of the two input images at an equal ratio based on expressions (1) to (3):

$$r = 0.5 \times r_a + 0.5 \times r_b \quad (1)$$

$$g = 0.5 \times g_a + 0.5 \times g_b \quad (2)$$

$$b = 0.5 \times b_a + 0.5 \times b_b \quad (3)$$

where, when synthesizing processing are performed on input images A and B, $r_a$, $g_a$, and $b_a$ correspond to signals R, G, and B of the input image A, respectively; $r_b$, $g_b$, and $b_b$ correspond to signals R, G, and B of the input image B, respectively; and r, g, and b corresponds to signals R, G, B of the synthesized image, respectively.

At step S30, in the synthesizer 24, synthesizing processing is performed on the DCT coefficient of each corresponding location in the corresponding blocks of the two input images, at an equal ratio based on expressions (4) to (6):

$$y = 0.5 \times y_a + 0.5 \times y_b \quad (4)$$

$$u = 0.5 \times u_a + 0.5 \times u_b \quad (5)$$

$$v = 0.5 \times v_a + 0.5 \times v_b \quad (6)$$

where, when synthesizing processing is performed on input images A and B, $y_a$, $u_a$, and $v_a$ correspond to signals y, u, and v of the input image A, respectively; $y_b$, $u_b$, and $v_b$ correspond to signals y, u, and v of the input image B, respectively; and y, u, and v corresponds to signals y, u, and v of the synthesized image, respectively.

Thus, the synthesizer 24 causes an image to be obtained by performing synthesizing-processing in which two input images are combined half and half. For example, the processing is one step among the above-described dissolve processing.

When synthesizing processing is performed at step S30, quantization as the subsequent step is performed at step S28, which is the matching step of dequantization at step S22. When synthesizing processing is performed at step S25, YUV-conversion as the subsequent step is performed at step S26, which is the matching step of RGB-conversion at step S24. The compressed image blocks obtained at steps S25 and S30 are identical.

The synthesizer 24 is generated by the synthesizer-generator 27. FIG. 12 shows an example of the synthesizer-generator 27 and a matrix (the synthesizer 24) generated therewith.

The synthesizer-generator 27 generates the synthesizer 24 for producing the processing block through synthesizing-processing which consists of the predetermined processing steps. Specifically, a synthesizing matrix (the synthesizer 24) is output from the synthesizer-generator 27 based on a synthesizing ratio. For example, a matrix (the synthesizer 24), as shown in FIG. 12, combines each pixel of two 8×8 input blocks at a synthesizing ratio of 20% to 80% to perform synthesizing processing on the images.

For example, matrices (the synthesizer 24) are generated for displaying images with a "dissolving effect" by causing the synthesizer-generator 27 to apply a matrix with a slightly different synthesizing ratio to each frame of the moving picture.

A synthesizing-processing matrix which is repeatedly used can be generated and stored, prior to the synthesizing processing, thereby allowing the matrix to be reused in the future.

A synthesized image produced by the synthesizer 24, which is generated by the synthesizer-generator 27, is input to the encoder 26.

The encoder 26 encodes a synthesized processing block by the synthesizer 24. As described above with reference to FIG. 9, the encoding processing includes a plurality of processing steps, which match the decoding processing steps at the decoder 23. Also, the encoder 26 can encode from any step of the encoding processing in a similar manner as the decoder 23 can decode.

Incidentally, the encoder 26 is required only when input image data to the image editing device 1 is encoded. Hence, the encoder 26 does not have to be provided in a case where the input image data is not encoded.

The output data $D_5$ from the encoder 26 is input to the data output device 10b.

The output data $D_5$ is organized as an output unit, a single image for example, by combining the above-described-processing results and consists of image data with an arbitrary file format, such as DV, MPEG, JPEG, and BMP.

The file format of the output data $D_5$ is not necessarily identical to that of the input data $D_1$ from the data input device 10a.

The image editing device 1 has the above-described configuration. The configuration allows the image editing device 1 to divide the digital signals, such as the still image or the moving image, into a processing block in the space domain, the time domain, or the frequency domain, and to process the digital signals independently of each processing block.

Therefore, the image editing device 1 can perform processing only on a minimum required region of the entire image for editing.

Figure 13:
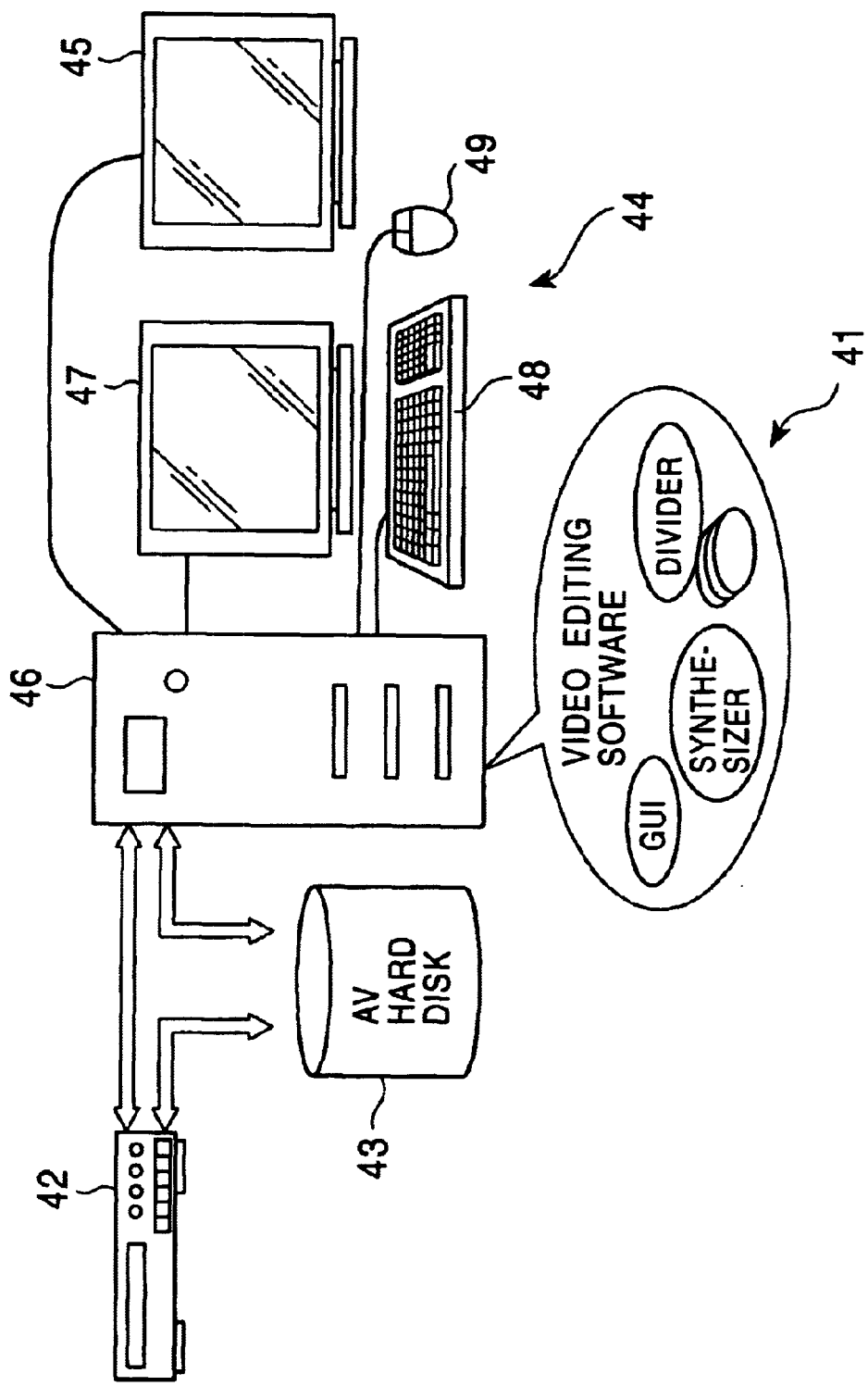
FIG. 13 is a block diagram of the image editing device in detail.

For example, the image editing device 1 can be applied to an editing system for editing the DV. FIG. 13 shows an actual configuration of a DV editing system 41.

As shown in FIG. 13, the DV editing system 41 includes a DV camera-deck 42, a hard-disk drive for audio and video applications (hereinafter referred to as an "AV hard disk") 43, a personal computer 44 and a television monitor 45. The personal computer 44 includes a main unit 46, a display monitor 47, a keyboard 48, and a mouse 49. The configuration of the personal computer 44 is similar to that of a standard personal computer.

The DV camera-deck records and plays back audio-image data (hereinafter simply referred to as "image data") in the DV format.

The AV hard disk 43 stores the image data.

The personal computer 44 performs editing-processing on the image data.

In the DV editing system 41, the personal computer 44 has the equivalent functions of the image editing device 1. Those functions are implemented by software, such as video editing software. For example, a software program, such as a dynamic link library (DLL), is installed in the main body 46, and is internally called from the video editing software.

The image editing device 1 can be hardware-implemented as, for example, an LSI chip on a PCI board and can be operated via a PCI bus.

The image editing device 1 can perform image processing with only software-implementation using a general-purpose CPU or can perform image processing with a partial or entire hardware-implementation.

The image from the DV camera-deck 42 is output at the television monitor 45. Moreover, the television monitor 45 is connected to the personal computer 44, which allows the user to confirm an outcome obtained by editing-processing while editing-processing is performed on the image.

The personal computer 44 is connected to the DV camera-deck 42 so that the DV camera-deck 42 can be controlled by the personal computer 44, thereby operating the DV camera-deck 42 via, for example, IEEE 1394.

The personal computer 44 and the AV hard disk 43 exchange data via, for example, an ultra small computer system interface (SCSI) bus.

The DV camera-deck 42 and the AV hard disk 43 exchange data via, for example, IEEE 1394 where the AV hard disk 43 acquires the data from the DV camera-deck 42 and the DV camera-deck 42 writes the data to the AV hard disk 43.

With the above-described configuration, the operations of the main components of the DV editing system 41, such as the divider 21, are described by an actual editing processing. In this example, the image-switching is performed by a "horizontal wipe effect" mainly obtained by performing synthesizing processing on two DV images.

Figure 14:
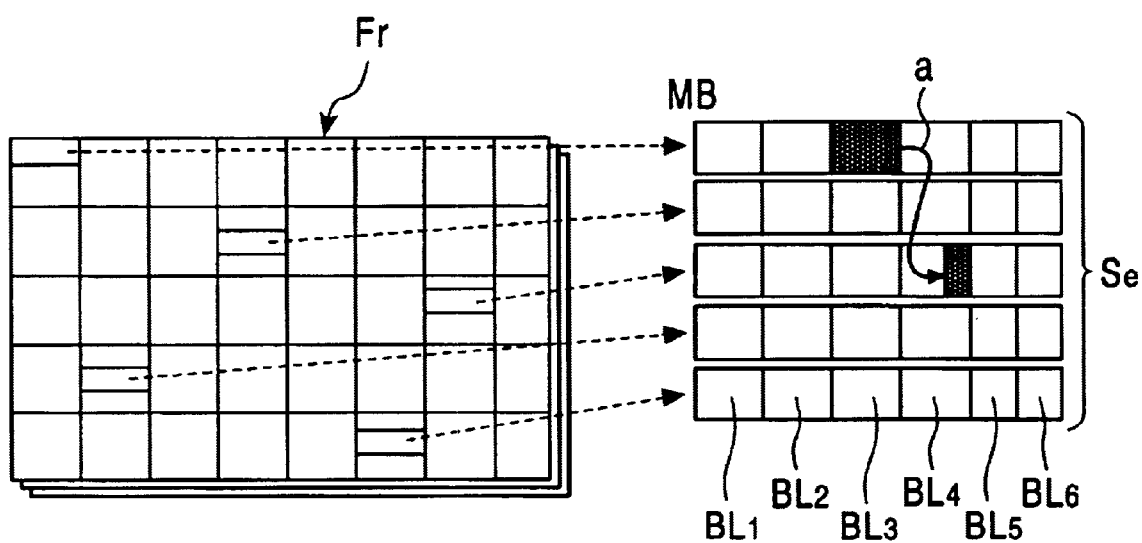
FIG. 14 shows the specifications of digital video (DV) format.

FIG. 14 shows an outline of the specifications of the general DV format. In the DV format, a single image frame $F_r$ includes a plurality of video-segments $S_e$ whose data-size is fixed.

Each video-segment $S_e$ includes five compressed macro-blocks MB whose data-size is fixed. The macro-block MB, i.e., a component of the video-segment $S_e$, is dispersed on the image, which is so-called "shuffled".

Each macro-block MB includes six blocks, which consist of four luminance blocks and two chrominance blocks, $BL_1$, $BL_2$, $BL_3$, $BL_4$, $BL_5$, and $BL_6$, each of which has a different data-size where a maker "EOB" representing "End Of Block" is stored at the end of the data.

Each of the compressed blocks BL is stored at a region which has a fixed start location and a fixed data-size thereof. When the data of the block BL overflows the region, an overflowed portion of the data is stored at a spare region of another block BL of the same macro-block MB, or of another macro-block MB of the same video-segment $S_e$. For example, in FIG. 14, the overflowed portion is stored at the region where arrow "a" points to. This case is a so-called "overflow condition".

The divider 21 divides the compressed macro-block MB as a processing unit out of a DV format image based on the above-described specifications.

Processing for acquiring a block data from an arbitrary compressed macro-block is described. As described above, when the macro-block is in the overflow condition, the block data has to be obtained by reconstructing scattered data over a plurality of the blocks.

Initially, a single image frame of the image data is loaded onto the memory 2, and a map, such as a dividing information map, is created where the start address of each compressed macro-blocks, the start addresses of the overflowed portions of each macro-block and the like are contained. The dividing information map is processed as a location information for the processing unit.

The entries of the dividing information map are implemented as structures, as shown in FIG. 15 for example.

A structure "BlockInfo" has overflow information for each block. Information on whether or not the overflowed-data is stored in another block is contained in "bOverflowed". When the block is in the "overflow condition", the location information of the overflowed-data is contained, for example, the block number of the overflowed-data stored block is contained in "nDestB", and the offset from the start address of the overflowed-data stored block in "nOffset", thereby obtaining the location of the overflowed-data by combining the block number and the offset. The block data size including the size of the overflowed-data is contained in "nDataSize".

In a structure "MacroBlockInfo", "pMB" contains the address of the compressed macro-block in the memory 2 and array "blocks" contains "BlockInfo" structures for six blocks which are the elements of the macro-block.

In a structure "VideoSegment", array "macroBlocks" contains "MacroBlockInfo" structures for five compressed macro-blocks which are the elements of the video-segment.

In a structure "DVFrame", array "videoSegments" contains "VideoSegment" structures for all video-segments which are the elements of a single image frame.

With the structures, the dividing information map is formed. By the use of the dividing information map, a processing block in an arbitrary location can be easily obtained when some processing is performed on the processing block by the synthesizer 24 or the duplicator 25.

Figure 16:
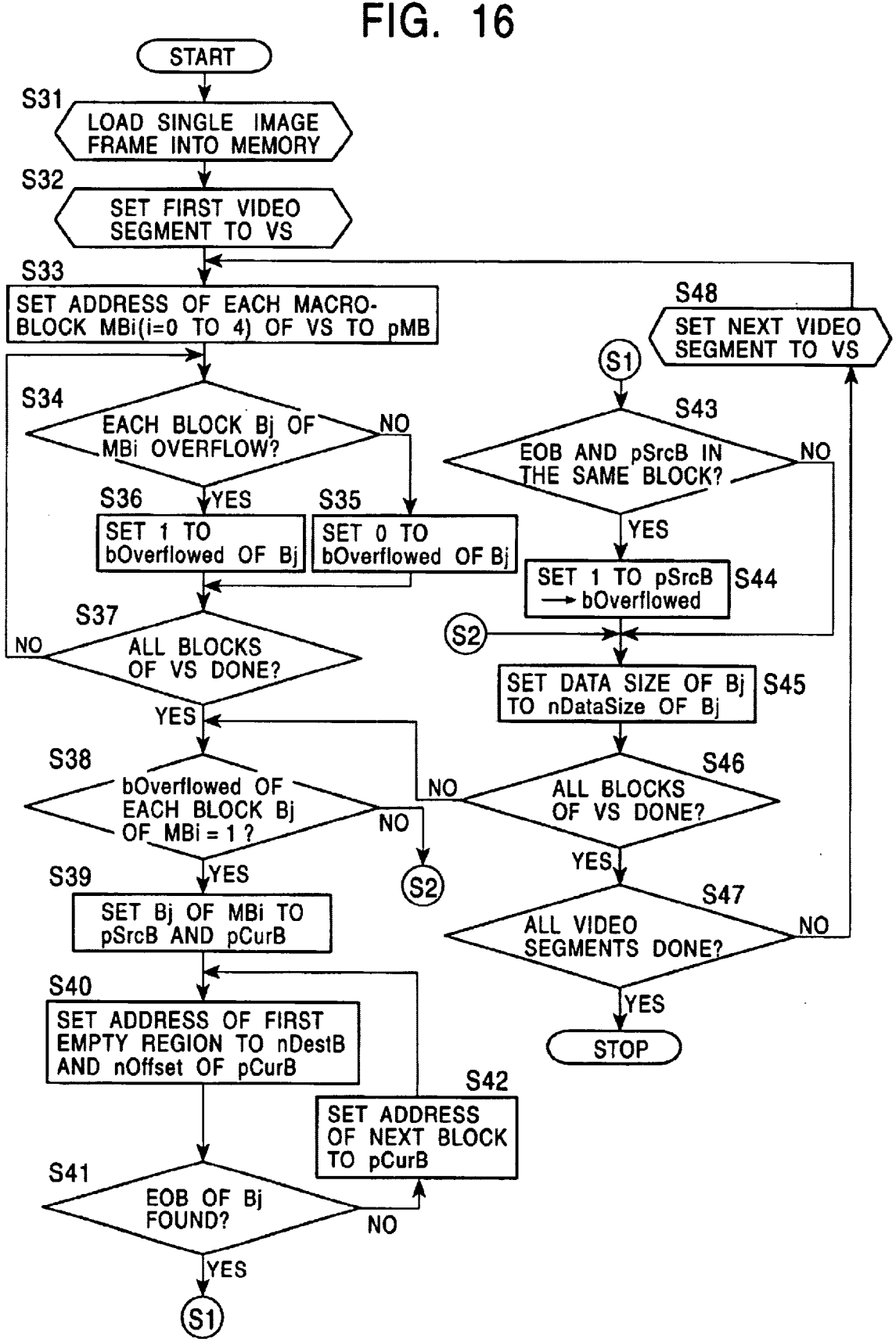
FIG. 16 is a flowchart of a process for dividing into a compressed macro-block in the DV format.

FIG. 16 shows a process for creating the dividing information map for all blocks of a single image frame.

At step S31, the single image frame is loaded into the memory 2.

At step S32, the first element of the video-segments of the image frame, which corresponds to structure "VideoSegment", that is, videoSegments[0], is set to a variable "VS".

At step S33, the address of each of five macro-blocks MBi of the variable "VS" of the memory 2 is set to VS.macroBlocks[i].pMB where i=0 to 4.

At step S34, it is determined whether or not each of six blocks $B_j$ (j=0 to 5) is in the "overflow condition" for each macro-block MBi. It is determined by searching for the marker "EOB" in the block whether or not a block is in the "overflow condition". If the marker "EOB" is found in the block, then the process proceeds to step S35 where overflow-flag "VS macroBlocks[i].blocks[j].bOverflowed" is set to 0; otherwise, the process proceeds to step S36 where overflow-flag "VS.macroBlocks[i].blocks[j].bOverflowed" is set to 1.

After determining whether or not every block of the macro-block is in the "overflow condition", the process proceeds to step S37 where it is determined whether or not all macro-blocks of the variable "VS" are done. When the overflow-determination processing is not performed on every macro-block of the variable "VS", the process proceeds back to step S34. The determination processing at step S37 is performed in order to cause steps S34 through S36 to be performed on every block of the variable "VS".

At step S38, it is determined whether or not "VS.macroBlocks[i].blocks[j].bOverflowed" is set to 1 for a block $B_j$ of each macro-block MBi of the variable "VS". If "VS.macroBlocks[i].blocks[j].bOverflowed" is set to 1, then the process proceeds to step S39. At step S39, a block structure, i.e. "VS.macroBlocks[i].blocks[j], is set to variables "pSrcB" and "pCurB"; otherwise, the process proceeds to step S45.

The processing at steps S38 and S39 causes a block structure, "VS.macroBlocks[i].blocks[j]", to be successively set to variables "pSrcB" and "pCurB" when "VS.macroBlocks[i].blocks[j].bOverflowed" of a block $B_j$ of each macro-block MBi of the video-segment is set to 1.

At step S40, a search for a spare region is performed for among the blocks of the macro-block MBi where "VS.macroBlocks[i].blocks[j]"is set to 0. When the spare region of the block of the macro-block MBi is found, the block number of the block is set to "nDestB" of "pCurB", and the distance (the number of bits) between the start address of the block and the start address of the spare region of the block is set to "noffset" of "pCurB".

When a spare region is not found among the macro-block MBi, the spare region is obtained by searching among other blocks of the same video-segment. The block number of the block is set to "nDestB" of "pCurB", and the distance (the number of bits) between the start address of the block and the start address of the spare region of the block is set to "nOffset" of "pCurB".

At step S41, it is determined whether or not the marker "EOB" for the data of the block $B_j$ is found in the block indexed by "nDestB" of "pCurB". When the marker "EOB" for the data of the block $B_j$ is not found in the block indexed by "nDestB" of "pCurB", the process proceeds to step S42 where the address of the block structure represented by "nDestB" of "pCurB" is set to "pCurB", and proceeds back to step S40. The process repeats step S40 until the marker "EOB" for the data of the block $B_j$ is found. If the maker "EOB" is found, the process proceeds to step S43.

At step S43, it is determined whether or not the marker "EOB" is found in the same macro-block as that of "pSrcB". If the marker "EOB" is found in the same macro-block as that of "pSrcB", then the process proceeds to step S44 where "bOverflowed" of "pSrcB" is set to 0; otherwise, the process skips step S44 and proceeds to step S45.

At step S45, the total data-size of the block $B_j$, which is obtained by combining each overflowed-data for the block $B_j$ data, is set to "nDataSize" of "pSrcB".

At step S46, it is determined whether or not the above-described processing is performed on all blocks of the variable "VS". If the processing is not performed on all blocks of the variable "VS", then the process proceeds to step S38; otherwise, the process proceeds to step S47.

As long as all blocks of the variable "VS" are not done, the process repeats steps S38 to S45 until all blocks of the variable "VS" are done.

At step S47, it is determined whether or not the above processing steps are performed on all video-segments of the image frame. If all video-segments of the image frame are done, then the process stops; otherwise, the process proceeds to step S48.

At step S48, structure "VideoSegment", which corresponds to the next element of the video-segments, is set to the variable "VS", and the process proceeds to step S33.

When it is determined at step S47 that steps S33 to S46 have been performed on all video-segments, the process stops; otherwise, a structure "VideoSegment", which corresponds to the next element of the video-segments, is set to the variable "VS", and the process proceeds back to step S33.

As is shown in the process of FIG. 16, the dividing information map is created for all blocks of the single image frame. Random access is performed on an arbitrary processing block among the output from the divider 21 based on the dividing information map. For example, by having the row number and the column number of a block input, the corresponding processing block body is obtained.

Figure 17:
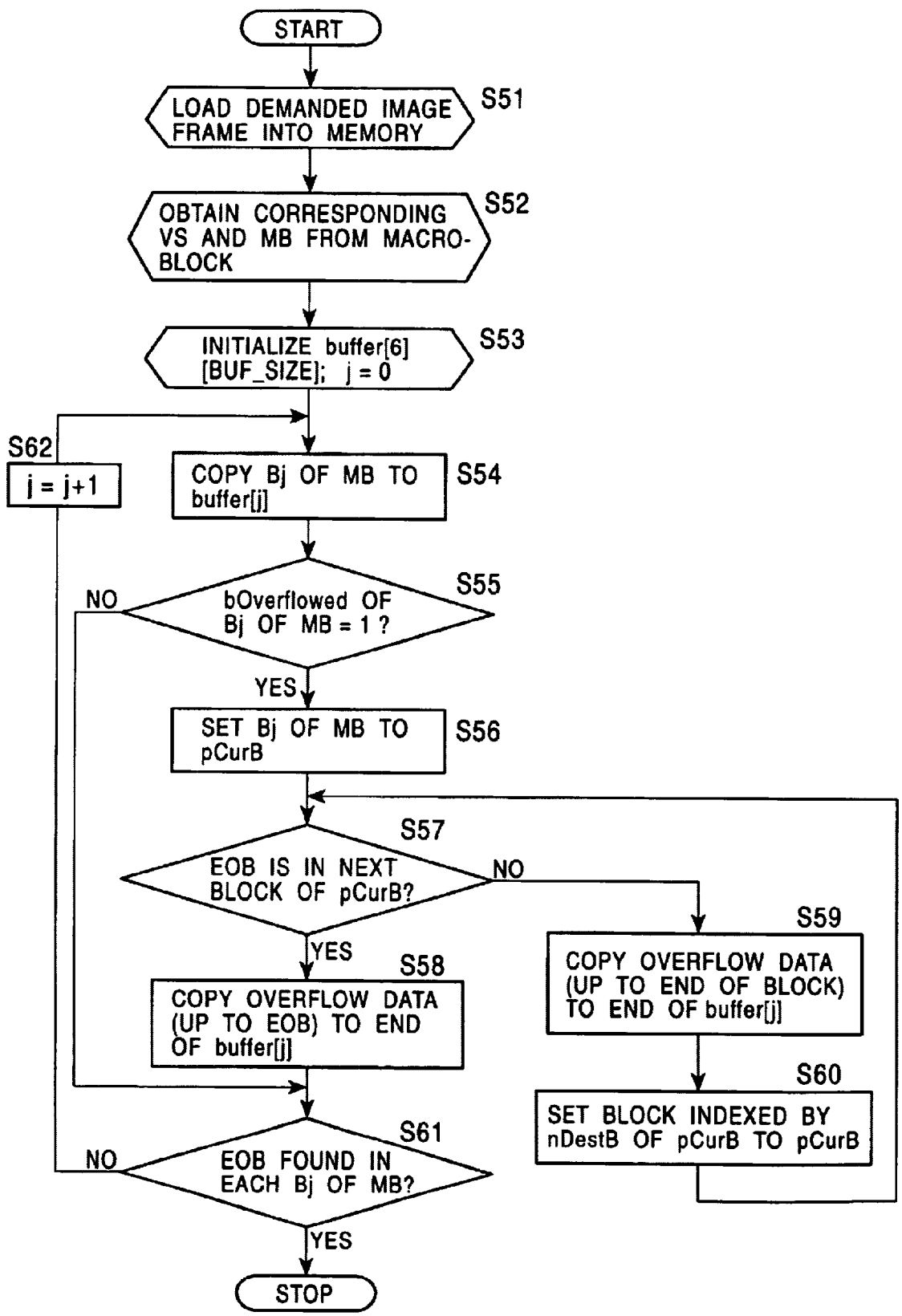
FIG. 17 is a flowchart of a process for extracting all blocks of a macro-block which is located in a designated location.

In this example, the processing block body is a macro-block or a block, which is compressed in accordance with the DV format. Using the dividing information map, an actual process for acquiring a macro-block in an arbitrary location is described with reference to FIG. 17.

At step S51, a single image frame, including the target macro-block, is loaded into the memory 2. The dividing information map for the image frame was already created when step S51 is performed.

At step S52, structure "VideoSegment" is set to the variable "VS" where the structure "VideoSegment" corresponds to the video-segment including the acquired macro-block whose location is represented by, for example, the row number and the column number. Also, structure "MacroBlockInfo" is set to a variable "MB".

At step S53, buffer[6][BUF_SIZE] is allocated for storing the acquired macro-block data by each block and is initialized by clearing the contents of the buffer. A variable "j" (0 to 5) is set to 0 where the variable "j" indexes any of six blocks, which are the elements of the macro-block.

At step S54, the contents of the region for a block $B_j$ of the variable "MB" is copied onto buffer[j] where the contents of block $B_j$ are not overflowed portions.

At step S55, it is determined whether or not "MB.blocks[J].bOverflowed" is set to 1. If "MB.blocks[j].bOverflowed" is set to 1, then the process proceeds to step S56; otherwise, the process proceeds to step S61.

At step S56, "MB.blocks[j]"is set to "pCurB".

At step S57, the location of the block which stores the overflow of "pCurB" is obtained by "nDestB" and "nOffset" of "pCurB". It is determined whether or not the marker "EOB" is found in the obtained overflow storing block. If the marker "EOB" is found, then the process proceeds to step S58; otherwise, the process proceeds to step S59.

At step S58, the data of the overflow storing block of the "pCurB", obtained at step S57, is copied, up to the marker "EOB", onto the end of "buffer[j]", and the process proceeds to step S61. At step S59, the data of the overflow storing block of the "pCurB", obtained at step S57, is copied, up to the end of the overflow storing block, onto the end of "buffer[j]", and the process proceeds to step S60. At step S60, the block structure corresponding to the block indexed by "nDestB" of "pCurB" is set to "pCurB", then the process proceeds to step S57.

At step S61, it is determined whether or not the marker "EOB" for the data of every block $B_j$ of the macro-block MB is found. If the marker "EOB" is found for the data of each block $B_j$ of the macro-block MB, then the process stops; otherwise, the process proceeds to step S62. At step S62, the variable "j" for block $B_j$ is obtained by adding 1 to j, and the process proceeds back to step S54.

With the above-described process, using the dividing information map, each block data of a macro-block is set to the corresponding buffer[0] to buffer[5].

An actual example which utilizes the extractor 22 is described.

Figure 18:
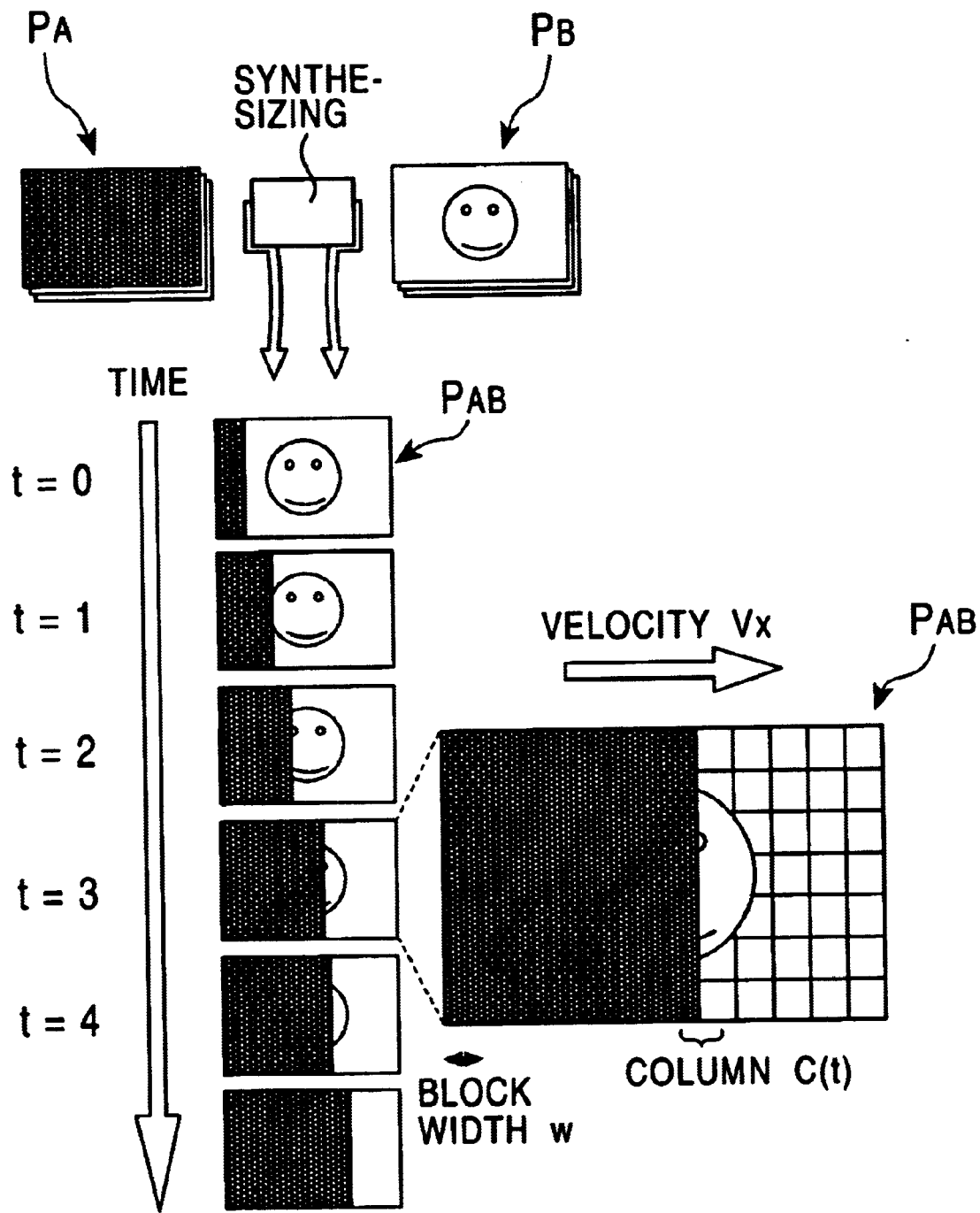
FIG. 18 shows image-switching by the use of "horizontal wipe" for describing actual operations of the extractor.

In this case, the operation of the extractor 22 is described by taking image-switching (horizontal wipe) as an example. Image-switching (horizontal wipe) is a displaying method for showing an image $P_{AB}$ by, as shown in FIG. 18, gradually showing another image $P_A$ so that image $P_{AB}$ appears from the left to the right of an image $P_B$. By determining the moving velocity of the image $P_A$, i.e. the moving velocity of the boundary between the images, the location of the boundary for each frame is obtained. The extractor 22 obtains a set of the processing blocks which intersect the boundary.

For example, the location (the column) C(t) of the processing blocks, containing some part of the boundary, is obtained based on the expression (7) where the moving velocity is $V_x$ (pixels/frame), the number of frames processed from the start of the wipe processing is t, and the width of the processing block is w (pixels).

$$C(t) = V_x \times t / w \quad (7)$$

The location C(t) of the processing block can be obtained by defining the moving velocity $V_x$ as a function of the number of frames t in a case where the moving velocity of the boundary is not constant. Also, it is generally considered that there can be a curved boundary or a plurality of boundaries. Even in these cases, the extractor 22 extracts the processing blocks which intersect every boundary of the frame.

Such processing allows the extractor 22 to obtain the column number of the processing blocks which intersect the boundary, that is, the processing blocks which need synthesizing processing. Since the processing blocks of all rows, whose column is indexed by the above-obtained column number, need synthesizing processing, the processing blocks are identified. The processing blocks are obtained by applying the function below to the processing blocks in the memory 2.

```
Pointer GetMacroBlock (struct DVFrame *pframe, int nRow, int nCol) {
    int nVideoSegment, nMacroBlock;
    MapRowCol2MacroBlock(nRow, nCol,
        &nVideoSegment, &nMacroBlock);
    return pFrame->
    videoSegments[nVideoSegment].macroBlockInfo
    [nMacroBlock].pMB;

}                                                    (8)
``` where "pFrame" corresponds to the structure "DVFrame" for the image frame in a memory 2, and "nRow" and "nCol" are the row number and the column number of the processing block (the macro-block), respectively. In the "DV" format, since the location of the macro-block is shuffled, the function "MapRowCol2MacroBlock" is called to obtain an index (nVideoSegment) of the video-segments and an index (nMacroBlock) of the macro-blocks of a video-segment, based on variables nRow and nCol. The function "MapRowCol2MacroBlock" can be implemented by preparing, for example, a reference table of the index for the video-segments/macro-blocks versus the rows/columns.

The extractor 22 thus identifies and obtains the processing blocks which need synthesizing processing. Also, the extractor 22 identifies and obtains the processing blocks which do not need another synthesizing processing.

Figure 19:
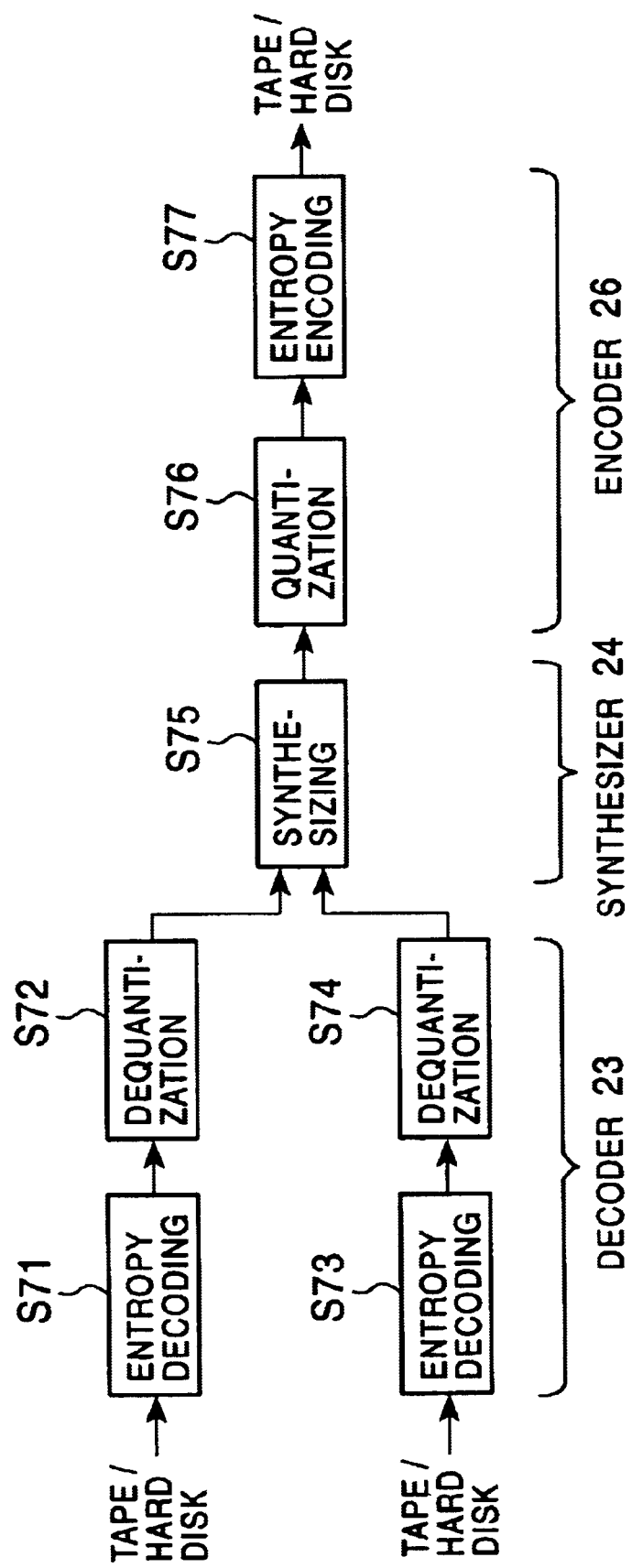
FIG. 19 is a diagram block for describing actual operations of the decoder, the synthesizer, and the encoder.

Actual operations of the decoder 23, the synthesizer 24 and the encoder 26 are described, referring to FIG. 19 as an example. The decoder 23, as shown in this example, decodes two input compressed image blocks for synthesizing from, for example, the tape or the hard disk. The decoding processing includes processing steps of entropy-decoding (step S71) and dequantizing (step S72) one compressed image block, and processing steps of entropy-decoding (step S73) and dequantizing (step S74) the other compressed image block. The synthesizer 24 performs synthesizing processing on the decoded processing blocks from the decoder 23 (step S75).

The encoder 26 encodes the synthesized processing block by the synthesizer 24. The encoding processing includes a step of quantizing the synthesized processing block (step S76) and entropy-coding the quantized processing block (step S77). The encoded compressed image blocks obtained by the encoder 26 are once again recorded on the tape or the hard disk.

The use of the decoder 23, the synthesizer 24 and the encoder 26 is further described in detail in a case where the "horizontal wipe effect" is realized by, for example, partially decompressing and recompressing two compressed images.

The decoder 23 decodes processing blocks extracted by the divider 21 and the extractor 22. The synthesizer 24 performs synthesizing processing on the DCT coefficients obtained by having the decoder 23 entropy-decode and dequantize the extracted processing blocks.

DCT coefficient-blocks "A" and "B" obtained by dequantizing are 8×8 matrix processing blocks. Now, the single frame will be described in a case where the rightmost three pixels of the DCT coefficient-block "A" and the leftmost five pixels of the DCT coefficient-block "B" are pasted when synthesizing processing are performed on these two processing blocks by the "horizontal wipe".

Each of decoding, synthesizing and encoding processing can be expressed by, for example, a corresponding matrix of the following expression (9):

$$C = DCT_{(8)} \cdot \begin{pmatrix} 1 & 0 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 0 & 0 & 1 \end{pmatrix} \cdot \quad (9)$$

$$\begin{pmatrix} IDCT_{(8)} & 0 \\ 0 & IDCT_{(8)} \end{pmatrix} \cdot \begin{pmatrix} A \\ B \end{pmatrix}$$

where $DCT_{(8)}$ and $IDCT_{(8)}$ are an 8×8 one-dimensional DCT matrix, and an 8×8 one-dimensional inverse DCT matrix, respectively. The decoder 23, the synthesizer 24, and the encoder 26 of the expression (9) correspond to expressions $$\begin{pmatrix} IDCT_{(8)} & 0 \\ 0 & IDCT_{(8)} \end{pmatrix} \quad (10)$$

$$\begin{pmatrix} 1 & 0 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 0 & 0 & 1 \end{pmatrix} \quad (11)$$

$$DCT_{(8)} \quad (12)$$

The synthesizer 24 can be thus expressed as a matrix. In the matrix consisting of 0s and 1s, another combination of matrices can be obtained by shifting the diagonal elements whose values are 1s. For example, another matrix is obtained as a new synthesizer 24 by shifting the elements of the matrix of the synthesizer 24 one-by-one for the columns as well as for the rows, whereby the processing block is obtained where the rightmost four pixels of the DCT coefficient-block "A" and the leftmost four pixels of the DCT coefficient-block "B" are pasted.

Specifically, $DCT_{(8)}$ and $IDCT_{(8)}$ are 8×8 matrices expressed by functions X(u) and x(n) of expressions (13) to (15), respectively:

$$X_{(u)} = C_{(u)} \sum_{n=0}^{7} x(n) \cos \frac{(2n+1)u\pi}{16} \quad (13)$$

$$X_{(n)} = \sum_{u=0}^{7} C_{(u)} X_{(u)} \cos \frac{(2n+1)u\pi}{16} \quad (14)$$

$$C_{(p)} = \begin{cases} \frac{0.5}{\sqrt{2}}, & (p=0) \\ 0.5, & (p \neq 0) \end{cases} \quad (15)$$

The synthesizer-generator 27, for example, pre-calculates the product of the matrices of expressions (10) to (12). In this case, by preparing at most seven matrices which have different pixel combinations obtained by shifting one pixel, pre-calculated products using these matrices are available for future reuse without re-computing the expression (9). There are nine above-mentioned pixel combinations, which are (0,8), (1,7), (2,6), . . . , (8,0). However, since no synthesizing processing is necessary in combinations (0,8) and (8,0), thus making seven pixel combinations practical.

Actual operations of the duplicator 25 are described in a case where a raw compressed macro-block is copied in the DV format. To describe the operations, actual duplicating processing by the duplicator 25 is used as an example, in a case where synthesizing processing is performed on images by "horizontal wipe".

When image synthesizing is performed by "horizontal wipe", the duplicator 25 duplicates a macro-block other than the macro-blocks including some of a boundary generated by performing synthesizing processing. In this case, the duplicator 25 must properly relocate the overflowed data of the destination macro-block where the overflowed data is stored in a macro-block other than the destination macro-block. Whereas, the overflowed data of the destination macro-block does not need to be relocated where the overflowed data of the destination macro-block is stored in the same destination macro-block.

Thus, the duplicator 25 can perform duplicating processing by extracting only the overflowed data of a block where the overflowed data is stored in a macro-block other than the macro-block the block belongs to.

Figure 20:
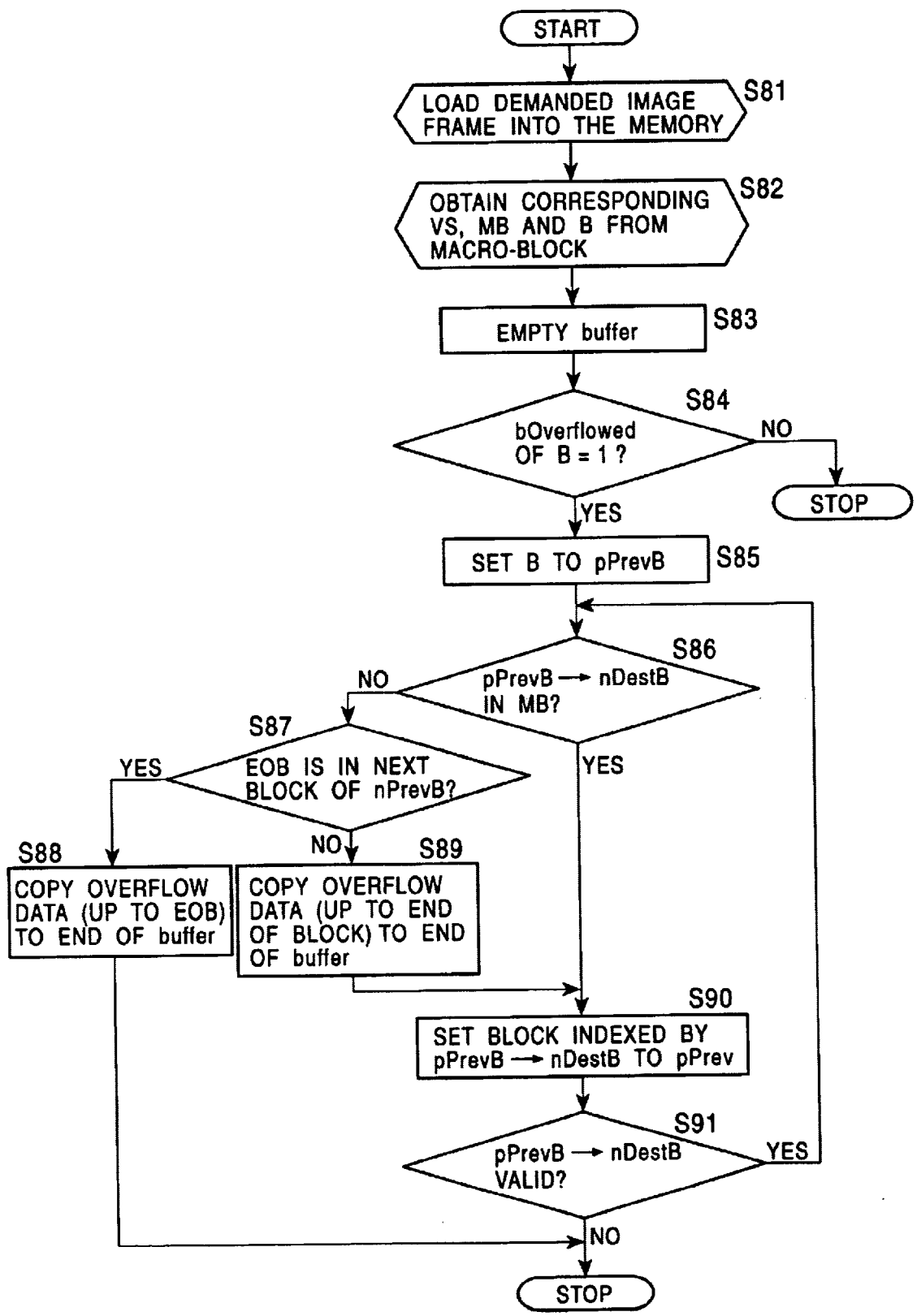

FIG. 20 shows a process that by the use of the dividing information map, the duplicator 25 extracts only the overflowed data of the block where the overflowed data is stored in the macro-block other than the macro-block the block belongs to.

At step S81, a single image frame, including the target block, is loaded into the memory 2. The dividing information map for the image frame was already created when step S81 is performed.

At step S82, the structure "VideoSegment" is set to the variable "VS" where the structure "VideoSegment" corresponds to the video-segment including the target block whose location is indexed by, for example, the row number and the column number. Also, the structure "MacroBlockInfo" is set to the variable "MB", and the structure "BlockInfo" corresponding to the target block is set to a variable B At step S83, buffer[BUF_SIZE] is allocated for storing the overflowed data for each block and is initialized by clearing the contents of the buffer.

At step S84, it is determined whether or not "B.bOverflowed" is set to 1. If "B.bOverflowed" is set to 1, then the process proceeds to step S85; otherwise the process stops because of no overflowed data in the target block.

At step S85, the variable "B" is set to a variable "pPrevB".

At step S86, it is determined whether or not "nDestB" of "pPrevB" is included in the variable "MB". If "nDestB" of "pPrevB" is one of six blocks of the variable "MB", then the process proceeds to step S90; otherwise, the process proceeds to step S87.

At step S87, the location of the block storing the overflowed data of "pPrevB" is obtained by "nDestB" and "nOffset" of "pPrevB". It is determined whether or not the marker "EOB" is found in the obtained overflow storing block. If the marker "EOB" is found, then the process proceeds to step S88; otherwise, the process proceeds to step S89.

At step S88, the data of the overflow storing block for the "pPrevB" is duplicated, up to the marker "EOB", onto the end of "buffer", and the process stops.

At step S89, the data of the overflow storing block for the "pPrevB" is duplicated, up to the end of the data of the overflow storing block, onto the end of "buffer", and the process proceeds to step S90

At step S90, the structure "BlockInfo" corresponding to the block indexed by "nDestB" of "pCurB" is set to new "pPrevB".

At step S91, it is determined whether or not the block indexed by "nDestB" of "pCurB" is valid, which means whether or not the overflow storing block for "pPrevB" exists. If the overflow storing block of "pPrevB" exists, the process proceeds back to step S86; otherwise, the process stops.

With the above-described process, using the dividing information map, the duplicator 25 stores the overflowed data of a target block in the buffer[BUF_SIZE] where the overflowed data is stored in a macro-block other than the macro-block the block belongs to.

Figure 21:
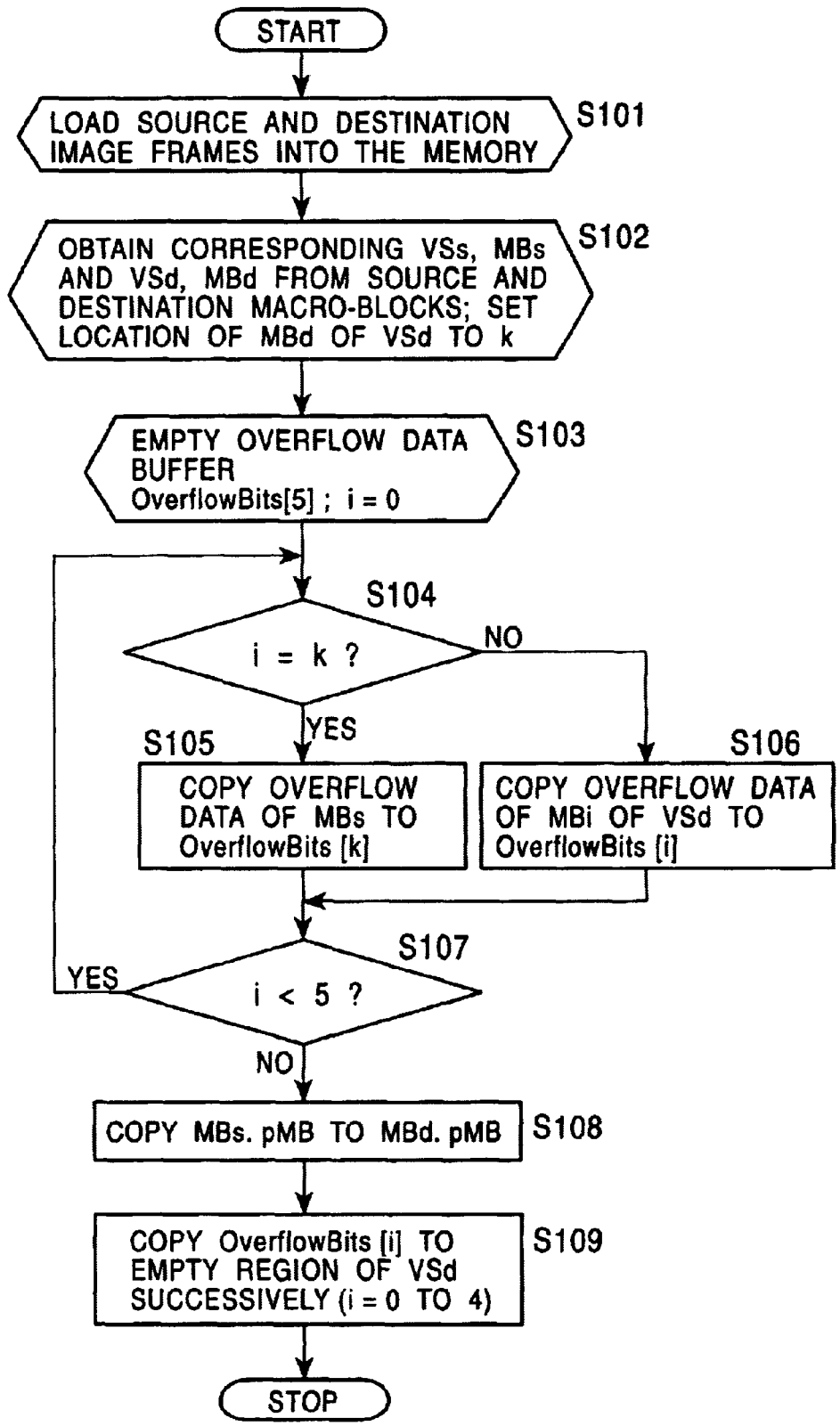
FIG. 21 shows a flowchart of a process in which the duplicator duplicates a macro-block to another location.
Figure 22:
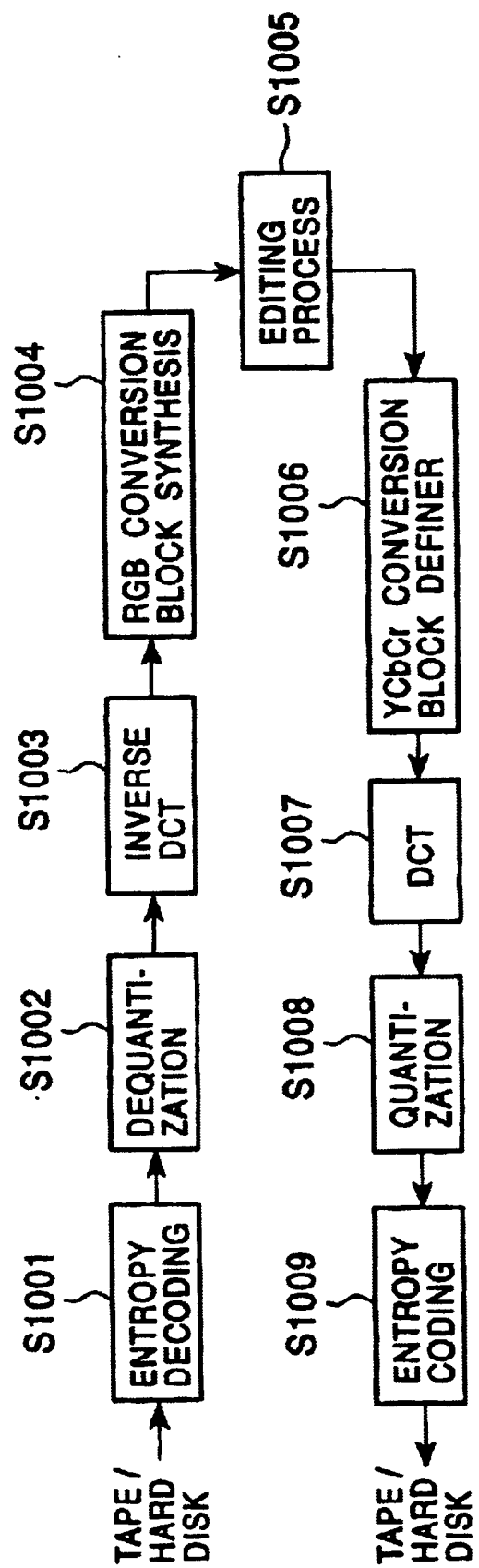
FIG. 22 shows a process of a conventional image editing processing.
Figure 23:
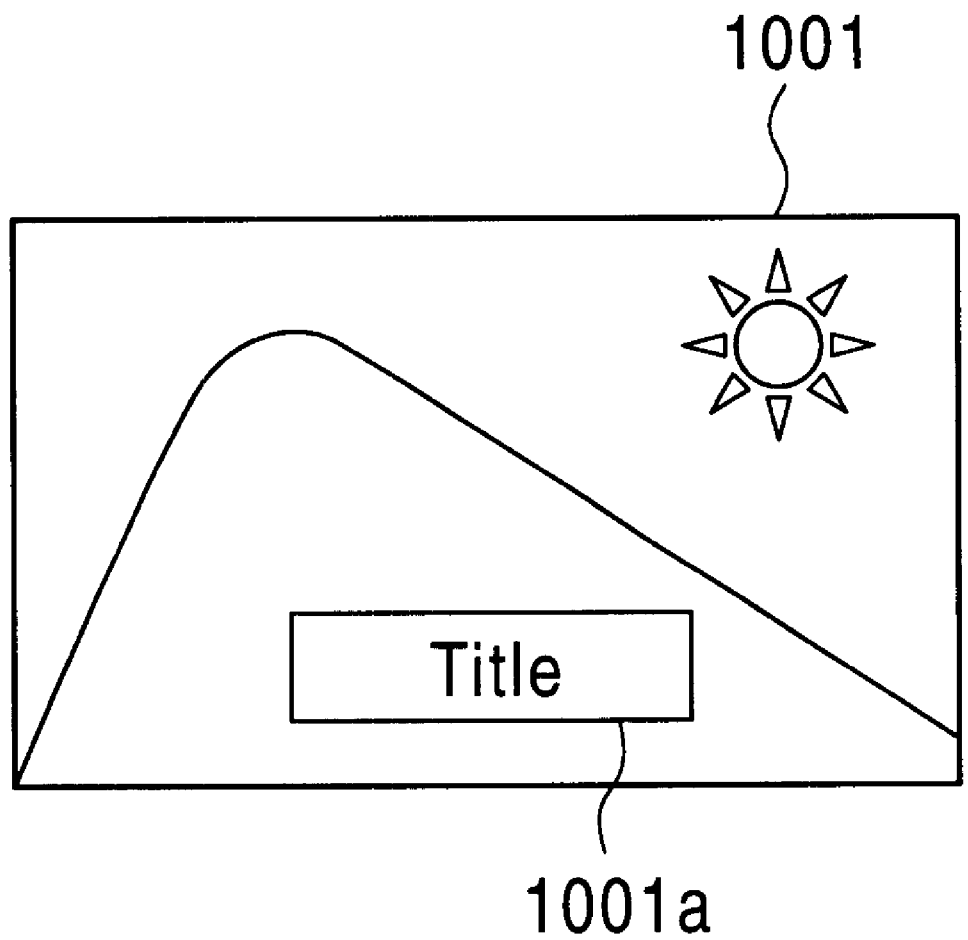
FIG. 23 illustrates a case where a title-character-block is inserted in the image.

With reference to FIG. 21, the process is described in a case where the duplicator 25 duplicates the contents of a macro-block to an arbitrary macro-block region. In this example, the destination video-segment has enough spare regions, thus the duplicated macro-block sure to be stored in the destination video-segment.

At step S101, each of image frames, including source and destination macro-blocks, are loaded into the memory 2. The dividing information maps for both image frames were already created when step S101 is performed.

At step S102, structures "VideoSegment" are set to variables "VSs" and "VSd", respectively where each of the structures "VideoSegment" corresponds to the video-segment having the source macro-block or the destination macro-block whose location is represented by, for example, the row number and the column number. Also, structures "MacroBlockInfo" are set to both variables "MBs" and "MBd", respectively. The location (0 to 4) of the variable "MBd" of the variable "VSd" is set to a variable "k".

At step S103, a buffer OverflowBits[5][BUF_SIZE] is allocated for storing the overflowed data for each macro-block and is initialized by clearing the contents of the buffer. A variable "i" is also initialized to 0.

At step S104, it is determined whether or not "i"="k". If "i"="k", then the process proceeds to step S105; otherwise, the process proceeds to step S106.

At step S105, the overflowed data of the variable "MBs" is copied onto the "OverflowBits[k]". The process, as shown in FIG. 20, for extracting only the overflowed data of a block is available where the overflowed data is stored in a macro-block other than the macro-block the block belongs to. At step S107, the process is sequentially applied to every block of the variable "MBs".

At step S106, the overflowed data of the macro-block "MBi" of the variable "VSd" is copied onto the "OverflowBits[i]". When step S106 is performed, since the process, as shown in FIG. 20, for extracting only the overflowed data of a block is available where the overflowed data is stored in a macro-block other than the macro-block the block belongs to, the process is sequentially applied to every block of the variable "MBi" where "i"≠"k".

At step S107, it is determined whether or not "i" is less than five. If "i" is less than five, the process proceeds back to step S104; otherwise, the process proceeds to step S108.

At step S108, the data of the variable "MBs", which does not overflow out of the block, is copied onto the region for the variable "MBd" which is represented by "MBd.pMB".

At step S109, the overflowed data stored in each. "OverflowBits[i]" (i=0 to 4) is sequentially copied to the spare region represented by the variable "VSd".

When a particular macro-block is duplicated, the duplication is performed by, for example, a function represented by the following expression (16):

void CopyMacroBlock (VideoFrame *pDstFrame, int nDstRow, int nDstCol, VideoFrame *pSrcFrame, int nSrcRow, int nSrc-Col)                                                                                (16)

where pDstFrame is a destination video-frame for the duplication, nDstRow and nDstCol represent the location (the row and the column) of a macro-block of the destination video-frame, pSrcFrame is a source video-frame for the duplication, and nSrcRow and nSrcCol represent the location (the row and the column) of a macro-block of the source video-frame.

By the above-described process, the duplicator 25 duplicates a macro-block to an arbitrary macro-block region.

With the above-described processing, the DV editing system 41 of FIG. 13 extracts a processing block out of the single image frame and performs processing on a minimum required region.

What is claimed is:

1. A signal editing device comprising:
   dividing means for dividing a digital signal into processing blocks in the frequency and space domains; and
   processing means for processing said digital signal independently in units of said processing blocks, said processing being performed in both the frequency and space domains, wherein at least one processing block having a predetermined frequency component of said digital signal is processed;

wherein,
   said processing means performs synthesizing processing on at least two moving pictures;
   an image frame from each of said moving pictures is extracted at each editing point by performing dividing processing in the time domain; and
   a desired region to be processed is extracted out of the extracted image frames of the moving pictures by performing dividing processing in the space domain while low frequency components of said moving pictures are extracted by performing dividing processing in the frequency domain, whereby a reduced image is generated from said low frequency components, and a synthesized video image is obtained by combining a result of said dividing processing in said frequency and space domains.

2. A signal editing device according to claim 1,
   wherein said digital signal is compression-coded in compression-coded processing units; and
   wherein said dividing means divides said digital signal into said processing blocks as said compression-coded processing units.

3. A signal editing device according to claim 1, further comprising a processing block extracting means for extracting a processing block requiring the processing of said digital signal and a processing block requiring no processing of said digital signal.

4. A signal editing device according to claim 3, further comprising a duplicating means for duplicating said processing block requiring no processing, which is extracted by said processing block extracting means.

5. A signal editing device according to claim 1, further comprising:
   decoding means for decoding said digital signal in a predetermined format and for outputting the decoded signal to said processing means; and
   encoding means for encoding an output signal from said processing means in a predetermined format.
   wherein said digital signal is compression-coded.

6. A signal editing device according to claim 5,
   wherein said decoding means performs a plurality of decoding processing steps, and
   wherein said encoding means performs a plurality of encoding processing steps corresponding to the decoding processing steps.

7. A signal editing device according to claim 1,
   wherein said processing means performs processing on the processing blocks by using predetermined processing steps, and
   wherein said predetermined processing steps are created before said processing is performed.

8. The signal editing device according to claim 1 wherein said digital signal represents an image having a first resolution, and a thumbnail image having a second resolution lower than said first resolution is obtained by said processing means processing at least one processing block containing an extracted DC component of said digital signal.

9. The signal editing device according to claim 1, wherein said dividing means divides first and second moving digital image signals into processing blocks in at least the space domain; and wherein wipe processing of said first and second image signals is performed by said dividing means extracting a boundary region of said first and second image signals around a boundary where image switching occurs, duplicating portions of original images of said first and second image signals and performing synthesizing processing on said duplicated portions and said boundary region.

10. A signal editing method comprising the steps of:

dividing a digital signal into processing blocks in the frequency and space domains; and processing said digital signal independently in units of said processing blocks, said processing being performed in both the frequency and space domains wherein at least one processing block having a predetermined frequency component of said digital signal is processed;

wherein, said processing includes synthesizing processing of at least two moving pictures;

an image frame from each of said moving pictures is extracted at each editing point by performing dividing processing in the time domain; and a desired region to be processed is extracted out of the extracted image frames of the moving pictures by performing dividing processing in the space domain while low frequency components of said moving pictures are extracted by performing dividing processing in the frequency domain, whereby a reduced image is generated from said low frequency components, and a synthesized video image is obtained by combining a result of said dividing processing in said frequency and space domains.

* * * * *